(12) United States Patent
Brown et al.

(10) Patent No.: US 10,313,858 B2
(45) Date of Patent: Jun. 4, 2019

(54) SERVICE LAYER INTERWORKING USING MQTT PROTOCOL

(71) Applicant: Convida Wireless, LLC, Wilmington, DE (US)

(72) Inventors: Phillip Brown, Los Angeles, CA (US); Dale N. Seed, Allentown, PA (US); Paul L. Russell, Jr., Pennington, NJ (US); Guang Lu, Thornhill (CA); William Robert Flynn, IV, Schwenksville, PA (US); Lijun Dong, San Diego, CA (US); Hongkun Li, Malvern, PA (US); Xu Li, Plainsboro, NJ (US); Qing Li, Princeton Junction, NJ (US); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 168 days.

(21) Appl. No.: 15/327,146

(22) PCT Filed: Jul. 21, 2015

(86) PCT No.: PCT/US2015/041311
§ 371 (c)(1),
(2) Date: Jan. 18, 2017

(87) PCT Pub. No.: WO2016/014516
PCT Pub. Date: Jan. 28, 2016

(65) Prior Publication Data
US 2018/0213378 A1  Jul. 26, 2018

Related U.S. Application Data

(60) Provisional application No. 62/027,129, filed on Jul. 21, 2014.

(51) Int. Cl.
*H04W 4/70* (2018.01)
*H04L 29/08* (2006.01)
(Continued)

(52) U.S. Cl.
CPC ............... *H04W 4/70* (2018.02); *H04L 67/12* (2013.01); *H04L 67/42* (2013.01); *H04W 80/12* (2013.01); *H04W 88/18* (2013.01)

(58) Field of Classification Search
CPC ....... H04W 4/70; H04W 88/18; H04W 80/12; H04L 67/12; H04L 67/42
See application file for complete search history.

(56) References Cited

U.S. PATENT DOCUMENTS

2005/0198299 A1 * 9/2005 Beck .................... G06Q 10/107
709/226
2006/0167968 A1 7/2006 Reynolds et al.
(Continued)

FOREIGN PATENT DOCUMENTS

JP 2006-523905 A 10/2006
JP 2009-519509 A 5/2009
KR 10-2007-0048021 5/2007

OTHER PUBLICATIONS

Berners-Lee, "Uniform Resource Identifier (URI): Generic Syntax", Networking Group, RFC 3986, Jan. 2005, 72 pages.
(Continued)

*Primary Examiner* — Kim T Nguyen
(74) *Attorney, Agent, or Firm* — BakerHostetler

(57) ABSTRACT

Methods are proposed to integrate MQTT Server functionality into the oneM2M CSE, as well as to interconnect such CSE-based MQTT Servers into a network organized around a topic structure based on resource address. Methods can dynamically allocate, assign and deliver an identifier that can be used as the AE-ID by the AE, CSE and MQTT Server.

(Continued)

The MQTT Server can be internetworked into the M2M Service Layer such that an MQTT Server is available in every Service Layer node that hosts a CSE. MQTT Server-to-Server connections can be dynamically established to facilitate traffic between Service Layer entities

25 Claims, 28 Drawing Sheets

(51) Int. Cl.
*H04L 29/06* (2006.01)
*H04W 80/12* (2009.01)
*H04W 88/18* (2009.01)

(56) References Cited

U.S. PATENT DOCUMENTS

2010/0281154 A1 11/2010 Bedi et al.
2013/0179791 A1* 7/2013 Polski ................ H04L 67/26
                                                        715/733

OTHER PUBLICATIONS

International Patent Application No. PCT/US2015/041311: International Preliminary Report dated Feb. 2, 2017, 9 pages.
Kim et al, "MQTT Protocol Binding Scenarios", PRO-2014-0165R0210xxx-, WG3, Apr. 7, 2014, 11 pages.
OASIS Committee Specification 01, MQTT Version 3.1.1, May 18, 2014, 81 pages.
OneM2M TS-0010 V0.1.2, "MQTT Protocol Binding Technical Specification", Apr. 11, 2014, 20 pages.
OneM2M "Developing MQTT Protocol Binding", ProMQTTBinding-V0.0.1, Dec. 11, 2013, 3 pages.
OneM2M TS-0010 V0.20., "MQTT Protocol Binding Technical Specification", Jul. 9, 2014, 23 pages.
OneM2M TS-0001 V-0.7.0, "oneM2M Functional Architecture Baseline Draft", May 25, 2014, 337 pages.

* cited by examiner

SERVICE LAYER INTERWORKING USING MQTT PROTOCOL

CROSS-REFERENCE TO RELATED APPLICATIONS

This application is the National Stage of International Application No. PCT/US2015/041311, filed Jul. 21, 2015, which claims priority from U.S. Provisional Patent Application No. 62/027,129, filed on Jul. 21, 2014, the disclosures of which are incorporated herein by reference in their entirety.

BACKGROUND

The oneM2M Service Layer is organized as a set of common functions (or service capabilities), an instantiation of which is referred to as a Common Services Entity (CSE). FIG. 1 is a diagram that illustrates common functions of the one M2M service layer that are exposed via the Mca, Mcc and Mcn reference points as shown in FIG. 1.

The Mca reference point designates communication flows between an Application Entity (AE) 102 and a CSE 104, while the Mcc reference point designates communication flows between two CSEs 104 and 106 in the same M2M Service Provider domain. Communications across Mca and Mcc take place via paired Request/Response messages, wherein each request performs a specific RESTful operation (e.g., Create, Retrieve, Update, Delete) upon a resource hosted on the targeted CSE.

Mcc' is used between CSEs located in the Infrastructure Domain of different M2M SPs. Mcn is used between a CSE 104 and an underlying Network Services Entity (NSE) 108 for services other than transport and connectivity.

In the oneM2M service layer, CSEs are hosted on architectural entities referred to as "nodes". A node is a functional entity that contains a) one CSE and zero or more AEs, or b) one or more AEs.

FIG. 2 is a diagram of a oneM2M architecture that supports various types of node configurations. FIG. 2 is a simplified representation and does not reflect all possible configurations or relationships between entities.

FIG. 3 is a diagram that illustrates an initial set of common service functions (CSF) performed by the oneM2M CSE 302. A particular CSE implementation may not support every function, but a complete implementation can include all the functions in the illustration.

The Uniform Resource Identifier Generic Syntax is an internet construct consisting of a hierarchical sequence of five components (scheme, authority, path, query and fragment). FIG. 4 is a diagram that illustrates the scheme, authority and path components of the Uniform Resource Identifier Generic Syntax that are significant in oneM2M addressing.

Every entity in the oneM2M Service Layer is represented as a resource in the ROA architecture. Each instantiation of an AE or CSE on a Service Layer node is required to have a unique identifier. This unique identifier is used to derive an absolute Uniform Resource Identifier (URI) that represents the root (or base) address of the resource structure for that entity on its hosting CSE. Every resource within that structure must also be uniquely addressable via a Fully Qualified Domain Name (FQDN) URI having a path component that discretely identifies the target resource, in either a hierarchical or non-hierarchical fashion. The FQDN provides the network address of the node that contains the CSE hosting the resource and the path provides the precise location of the targeted resource on that node.

The following two example URI values address the same resource and illustrate the above principles, first with a hierarchical path structure and then with a non-hierarchical structure:

1) //CSE04.M2MSPabc.com/CSEBase01/alpha/container02/instance01
2) //CSE04.M2MSPabc.com/CSEBase01/resource12345678

The underlined portion of URI #2 represents the address of the base resource structure for this example CSE, and also embodies the corresponding CSE identifier. The underlined portion of URI #1 represents the address of the resource structure for an application named "alpha", and also embodies the corresponding AE identifier.

The resource structure associated with a CSE or AE also contains an attribute known as PoA (pointOfAccess) which holds routing information—generally one or more IP addresses—used to establish communication with the node hosting the CSE or AE. In order to target an AE (e.g., with a notification) it is necessary to first reach the CSE with which the AE is registered and then use the information in the AE-PoA attribute to address the request to the target AE.

The Service Layer Request/Response messages comprise an API that is carried over an application protocol to facilitate message movement between Service Layer entities. Because the Service Layer is situated between the applications which it serves and the lower network layers, it is often referred to as "middleware" as illustrated in FIG. 5.

There are numerous choices for binding at the Application Protocol Layer, though ETSI M2M and oneM2M both agreed on HTTP and CoAP initially. oneM2M has committed to support Message Queuing Telemetry Transport (MQTT) protocol binding as well—a choice made interesting by the contrast between the Service Layer's RESTful request/response (one-to-one) message pairs and the event-driven, publish/subscribe (one-to-many) MQTT protocol. Despite these differences, MQTT remains an attractive choice for M2M applications due to its extremely low protocol overhead and simple, efficient design.

The MQTT protocol was initially developed by IBM and Eurotech in the late 1990s; it was submitted to the OASIS standards body in 2013 for formal adoption (process ongoing) and further development. MQTT is a low overhead message queuing and transport protocol tailored for constrained devices and low bandwidth networks that is most famously deployed in the Facebook Messenger mobile app.

FIG. 6 is a diagram that illustrates the publish/subscribe (or client/server) model of MQTT. The core elements of MQTT are clients (which can be both publisher 602 and subscriber 604), servers (also referred to as brokers), sessions, subscriptions and topics.

FIG. 7 is a diagram that illustrates the elements of MQTT. Like HTTP, the MQTT protocol is asymmetric in that it distinguishes between two different roles: client 702 and server 704.

In MQTT terms, a Client 702 is a program or device that uses MQTT. It always establishes the Network Connection to the Server. A Client 702 can Publish application messages that other Clients might be interested in.
    Subscribe to request application messages that it is interested in receiving.

Unsubscribe to remove a request for application messages.

Disconnect from the Server.

An MQTT Server 704 is an entity that accepts connections from Clients. Unlike HTTP it generally does not run any application logic, instead an MQTT Server 704 acts as an intermediary between Clients publishing application messages and the Clients which have subscribed to receive them.

Topics are the "Q" in MQTT—they are named message queues maintained by the server in order to link publishers with subscribers. An MQTT Client 702 assumes the role of publisher when it issues a PUBLISH message to an MQTT Server 704 (i.e., an instruction to deliver the opaque message payload to any Client subscribed to the supplied Topic Name), and assumes the role of subscriber when it issues a SUBSCRIBE message to the MQTT Server 704 (i.e., an instruction to receive any PUBLISH messages that match the supplied Topic Filter). A Topic Filter is an expression contained in a Subscription, to indicate an interest in one or more topics. A Topic Filter may include wildcard characters. PUBLISH messages are delivered with one of three QoS levels of assurance (at-most-once, at-least-once, exactly-once).

FIG. 8 is a diagram that illustrates sessions and subscriptions that represent two levels of attachment between a Client and a Server in MQTT. A session 801 and 802 is a stateful interaction (i.e., an active TCP/IP network connection) between a Client and a Server, and is identified by a unique Client Identifier. A session 801 and 802 can be established only by a Client sending a CONNECT message to a Server. Flags in the CONNECT, PUBLISH and SUBSCRIBE messages determine how session state is maintained if a session is disconnected.

Subscriptions 804 and 806 are the logical attachment of Clients to one or more topics (i.e., message queues) maintained by the Server. A subscription 806 is associated with only a single session 801, but it is possible to configure session state to be preserved in the event of session disconnection and to trigger delivery of stored subscribed messages when a subsequent session is established by the same Client. Thus, subscriptions may be "transient" (subscription 806) or "durable" (subscription 804).

A durable subscription 804 operating with the highest QoS level results in the Server operating in a store-and-forward mode for the associated Client (within the limits of the available storage capacity on the Server), whereas a transient subscription 806 paired with the lowest QoS level results in the Server operating in a pass-through mode for the associated Client.

MQTT network connections exist only between a Client 702 and a Server 704. From the perspective of an MQTT Client 702 all incoming Application Messages originate from the Server 704, and an MQTT Client 702 receiving an Application Message resulting from a subscription with the Server 704 might not even be able to reach the Client that originated that message at the network layer (e.g., IP). In that respect, the mechanism by which the Server 704 determines whether to forward an Application Message—matching the Topic Name against its list of subscriptions (i.e., Topic Filters)—treats the Topic Name field as a form of network address.

There is an intermediate step to consider, though, because the Server 704 does not associate a subscription directly with a network connection (e.g., an IP address). A subscription is associated with a session, and a session is associated with a Client Identifier (ClientID) that must be unique for every Client connecting to a Server. The ClientID is a UTF-8 encoded string of up to 65,535 bytes; however, a Server may restrict the length to no more than 23 UTF-8 encoded bytes. The ClientID mechanism allows for preservation of session state and enables store-and-forward capability (if desired).

Thus, the set of MQTT addressing associations is as follows:

| Network Connection address | Client Identifier | Subscription (Topic Filter) |
|---|---|---|
| 192.168.1.1 | Acme-Alarm-xyz | /Anytown/Elm St./1234/# |

"/" is the topic level separator used to divide Topic Name into hierarchical levels. "#" is the multi-level wildcard character that matches at any level(s) that follow. There is also a single-level wildcard character "+" that matches at only one level (not shown).

In this example, Acme Alarm Co. connected to an MQTT Server and established a session using its ClientID value of "Acme-Alarm-xyz". It subscribed to Application Messages with a Topic Name corresponding to any match for that street address (1234 Elm St., Anytown). Acme Alarm has installed sensors and a network controller at this location and the controller is publishing Application Messages with the Topic Name "/Anytown/Elm St./1234/<sensorX>/<info>". The Server compares incoming Application Messages to this subscription belonging to Acme and forwards any messages with a Topic match to the corresponding Network Connection address.

The MQTT V3.1.1 specification contains the following statement:

A single entity MAY conform as both an MQTT Client and MQTT Server implementation. For example, a Server that both accepts inbound connections and establishes outbound connections to other Servers MUST conform as both an MQTT Client and MQTT Server.

The conformance statement from the MQTT specification (above) addresses implementations that make use of reserved protocol fields (generally needed to distinguish Server-Server connections from Client-Server connections). However, it is possible to interconnect MQTT Servers without the need to distinguish Server-Server connections and without violating the specification, as follows:

If only one of the Servers is configured in this manner then there can be only a one-way flow of traffic between them, toward the Server with the embedded Client functionality. This enables it to subscribe to other Servers and steer traffic toward itself, as shown in FIG. 9.

FIG. 9 is a diagram that illustrates a one way flow of messages between MQTT Servers. In FIG. 9, the MQTT Client 902 identified as "S1/C1" has previously sent a SUBSCRIBE message to Server S1, causing Server S1 to establish a topic queue with the Topic Filter "S1/C1/#". Subsequently, any Publish message arriving at Server S1 with a Topic Name field in which the first five characters are equal to "S1/C1" will be forwarded to ClientS1/C1 902.

The "Publish" and "Subscribe" functions shown in the standalone Clients indicate which role (publisher or subscriber) the Client has when it handles the message shown in the flow.

The SUBSCRIBE message sent by the embedded Client function 904 in Server S1 to Server S2 causes Server S2 to establish a topic queue with the Topic Filter "S1/#". This is the action that forms the (one-way) connection between the two Servers. Subsequently, any PUBLISH message arriving at Server S2 with a Topic Name field in which the first two characters are equal to "S1" will be forwarded to Server S1. In this way a Client connected to Server S1 can be reached by a Client connected to either Server S1 or Server S2 (or any other Server with which Server S1 establishes a connection).

The connection can be torn down at any time by the Client 902 in Server S1 sending a DISCONNECT message to Server S2; the corresponding CONNECT message (prior to SUBSCRIBE) is not shown but is assumed. Note that Server S2 has no indication that the connection from the Client 902 in Server S1 is associated with another Server; Server S1 appears like any other Client to Server S2 (at the protocol level).

FIG. 10 is a diagram that illustrates bidirectional traffic flow between MQTT servers and Clients connected to either Server. In this case, both Clients S1/C1 and S2/C1 have previously sent a SUBSCRIBE message to their respective Servers, causing those Servers to establish a topic queue with the Topic Filter shown. The SUBSCRIBE messages sent by the embedded Client function in each Server cause the receiving Server to establish a topic queue with a Topic Filter that points to the originating Server+Client combination. Together this pair of actions forms a bidirectional connection between the two Servers—a Client connected to one Server can reach a Client connected to the other Server, and vice versa. Request/response messaging is thus made possible between Clients connected to different Servers.

It is important to note that the SUBSCRIBE messages sent between the Servers are independent of one another (i.e., one does not trigger the other at the protocol level). The Server receiving a SUBSCRIBE message has no way of being signaled in the protocol that the message is associated with a Client-enabled Server rather than a pure Client—at least not if the implementation is to remain standard-compliant. A simplistic approach in this scenario would be to establish static connections between Servers as part of system initialization, with each Server preconfigured with the information needed to establish its connections upon startup.

Alternatively, logic embedded in a standalone Server implementation could treat specific patterns in the Topic Filter field of the SUBSCRIBE message as a marker for a Server-originated message and use that marker as a signal to initiate a companion SUBSCRIBE message in the return direction. Upper layer logic with integrated Server functionality could also trigger and initiate connections dynamically on an as-needed basis.

So long as a managed hierarchical—or URI-like—structure is administered in the Topic Name space and global uniqueness of the values/addresses used to populate the Topic Name field is maintained, then continual bidirectional communication between Clients connected to cooperating Servers is possible.

oneM2M is developing a Technical Specification for MQTT Protocol Binding. Several configuration alternatives are shown in the Technical Specification with respect to placement of the MQTT Server within the oneM2M architecture, but all of these configurations share the characteristic that the MQTT Server is a functionally and logically distinct entity that communicates only with MQTT Clients and does not communicate with other MQTT Servers in the oneM2M Service Layer.

FIG. 11 is a diagram that illustrates a single MQTT Server 1102 within a Service Provider domain that maintains connections to every AE 1104 and CSE 1106 and 1108. This the most straightforward configuration.

FIGS. 12A and 12B illustrate the use of multiple MQTT servers in a oneM2M embodiment. An alternative to a single, monolithic MQTT Server in the Infrastructure Domain is to deploy multiple MQTT Servers at Middle Nodes and support MQTT closer to the network edge (only over the Mca reference point). Another alternative would be to have one (or possibly more) MQTT network(s) carrying Mca traffic in the Field Domain and a separate MQTT network carrying Mcc traffic back to the Infrastructure Domain. In this scenario interworking between the independent MQTT networks would be performed by the oneM2M Service Layer.

FIG. 13 illustrates a oneM2M embodiment with a MQTT server 1302. Applying the concept of a single MQTT Server (FIG. 11) to the oneM2M Architecture Configurations (FIG. 2) yields the illustration in FIG. 13. Traffic between any two Service Layer entities must flow through the MQTT Server 1302, and communication between any two Service Layer entities is not possible unless they are both connected to that MQTT Server 1302 (or unless the Service Layer provides additional logic to pass traffic from MQTT-connected entities to non-MQTT-connected entities).

The configuration shown in FIG. 13 is the focal point for current development work. It is possible to add MQTT Servers and redistribute the Service Layer entities among them (e.g., place MQTT Servers in the Field Domain as suggested in FIG. 12), but any change of the MQTT Server to which a specific MQTT Client connects would require providing the network address of the new Server to the Client beforehand. This is because MQTT lacks a mechanism for Clients to discover Servers, yet a Client always initiates the connection to a Server (so the network address must be available to the Client before a network connection can be made).

SUMMARY

Methods are described to integrate MQTT Server functionality into the oneM2M CSE, as well as to interconnect such CSE-based MQTT Servers into a network organized around a topic structure based on resource address. This addresses both the identifier assignment and network centralization and overhead problems described above.

Methods can dynamically allocate, assign and deliver an identifier that can be used as the AE-ID by the AE, CSE and MQTT Server. This is done under control of the CSE as part of the application registration process.

The MQTT Server can be internetworked into the M2M Service Layer such that an MQTT Server is available in every Service Layer node that hosts a CSE. The MQTT Server (referred to as "MQTT Server+" in this disclosure) is enhanced by embedding Client functionality and applying a hierarchical Application Layer addressing scheme, thus making it possible to deploy MQTT Server functionality in every CSE.

MQTT Server-to-Server connections can be dynamically established to facilitate traffic between Service Layer entities. With every CSE acting as both MQTT Server and Client in an interconnected network based on resource address, Service Layer primitives can be delivered directly from Originator to Target without being handled again by intermediate Service Layer logic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 14:
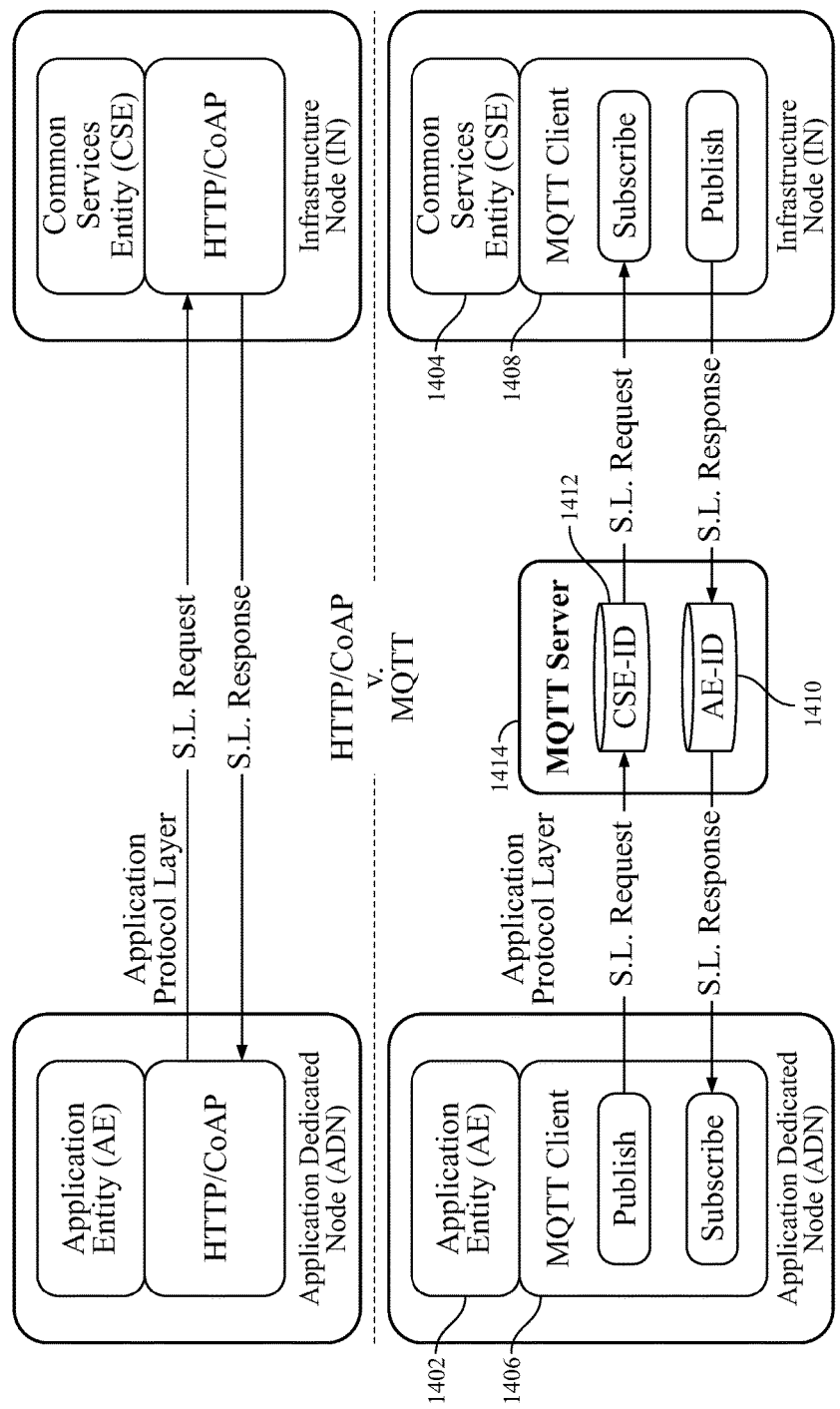
FIG. 14 is a diagram that shows an exemplary MQTT message flow for oneM2M.

FIG. 14 is a diagram that shows an exemplary MQTT message flow for oneM2M. The message flow for MQTT shown in FIG. 14 is feasible, but it relies on the Service Layer entity (AE 1402 or CSE 1404) to provide a unique Topic Filter value to an associated MQTT Client 1406 and 1408 for the purpose of establishing its MQTT Subscription. This "self-subscription" directs response (and notification) traffic back toward the subscribing entity. Note that in FIG. 14 the MQTT connection and subscription steps are assumed to have taken place successfully, and that the AE 1402 and CSE 1404 have used their respective Service Layer IDs as the Topic Filter values for the topic queues shown inside the MQTT Server 1414. While it might be possible to use values other than AE-ID and CSE-ID for this purpose, these IDs have the benefit of already uniquely identifying the entity, being carried in the Service Layer API and correlating well to the MQTT Topic Name structure.

There is, however, a specific problem with respect to the oneM2M AE. An AE 1402 (through its associated MQTT Client) must be able to pass a unique identifier to the MQTT Server 1414 in the Topic Filter field of the first SUBSCRIBE message sent prior to initial Service Layer registration. This provides the Server with a unique topic by which to route response messages flowing back toward the AE. The AE-ID cannot be used here because it is not assigned by the Registrar CSE until the AE registers—and the response to the registration request is what carries the AE-ID value back to the AE in the first place. Overall there is no general purpose mechanism available for dynamic provisioning of MQTT Topic Names, much less ones that are aligned with oneM2M identifiers (e.g., AE ID, CSE ID).

A second, more general problem lies in the inherent centralization of an MQTT network around the Server. As illustrated in FIG. 14, MQTT Clients cannot communicate directly with one another and must rely on the Server to broker communication between them. Yet the native MQTT protocol does not support communication between MQTT Servers; an MQTT Client connected to Server X cannot exchange messages with an MQTT Client connected to Server Y. Therefore, if more than one MQTT Server is to be present within an M2M SP domain (as the result of network expansion, for example) then interworking between the MQTT Servers must either be administered at the Service Layer level (entailing additional overhead) or avoided.

It is understood that the functionality illustrated in FIG. 14 may be implemented in the form of software (i.e., computer-executable instructions) stored in a memory of, and executing on a processor of, a node of an M2M network (e.g., a server, gateway, device, or other computer system), such as one of those illustrated in FIG. 22C or 22D described below.

Figure 15:
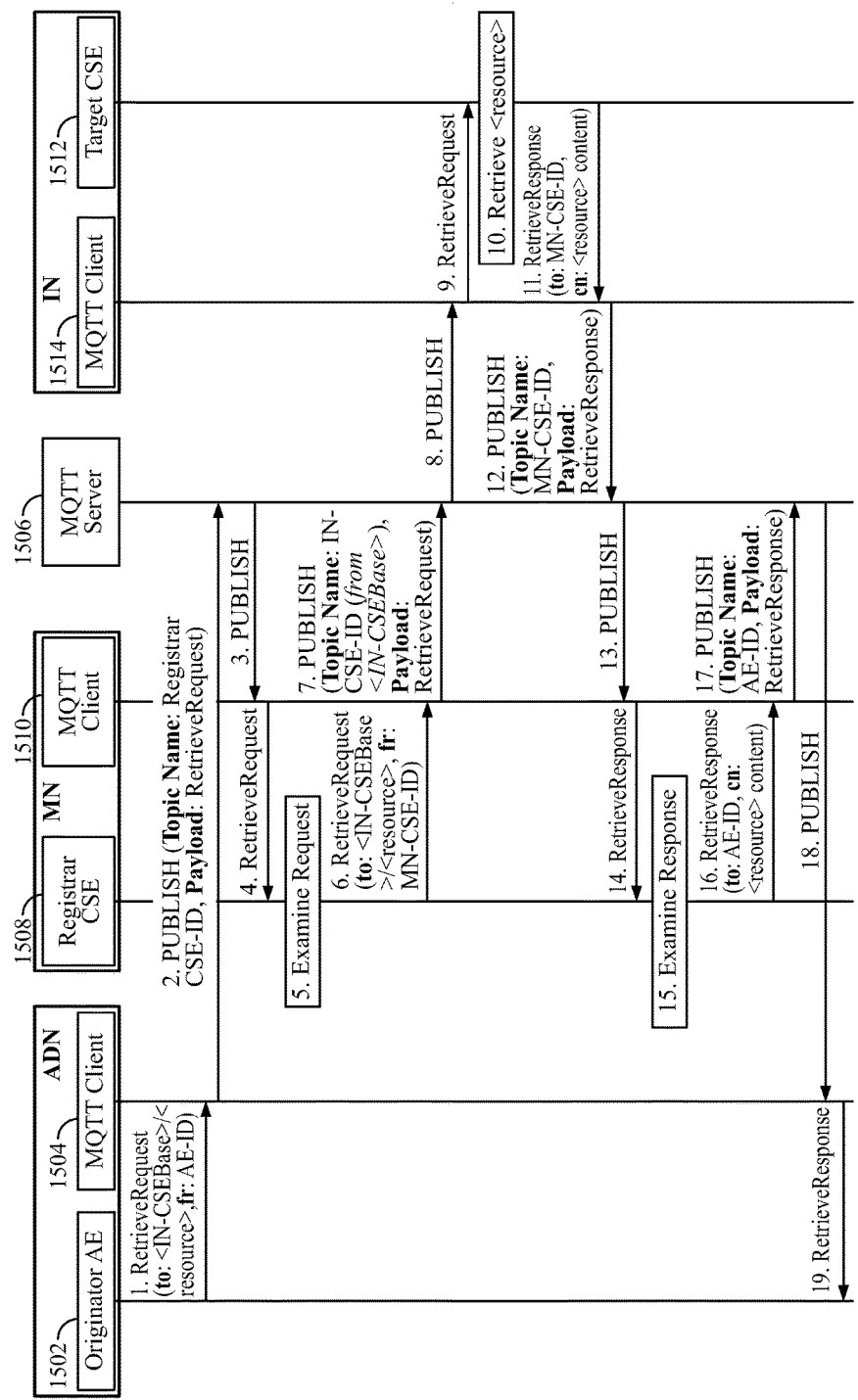
FIG. 15 is a diagram that illustrates an example message flow with a single standard MQTT Server located in the Infrastructure Domain.

FIG. 15 is a diagram that illustrates an example message flow with a single standard MQTT Server located in the Infrastructure Domain. This flow is representative of the way the oneM2M System would operate by following the MQTT protocol binding specified in oneM2M TS-0010 (once it is complete) as applied to both the Mca and Mcc reference points. It illustrates the inefficiency of this approach relative to the same Service Level operation performed in the Operation Steps of FIG. 19 described below.

Figure 1:
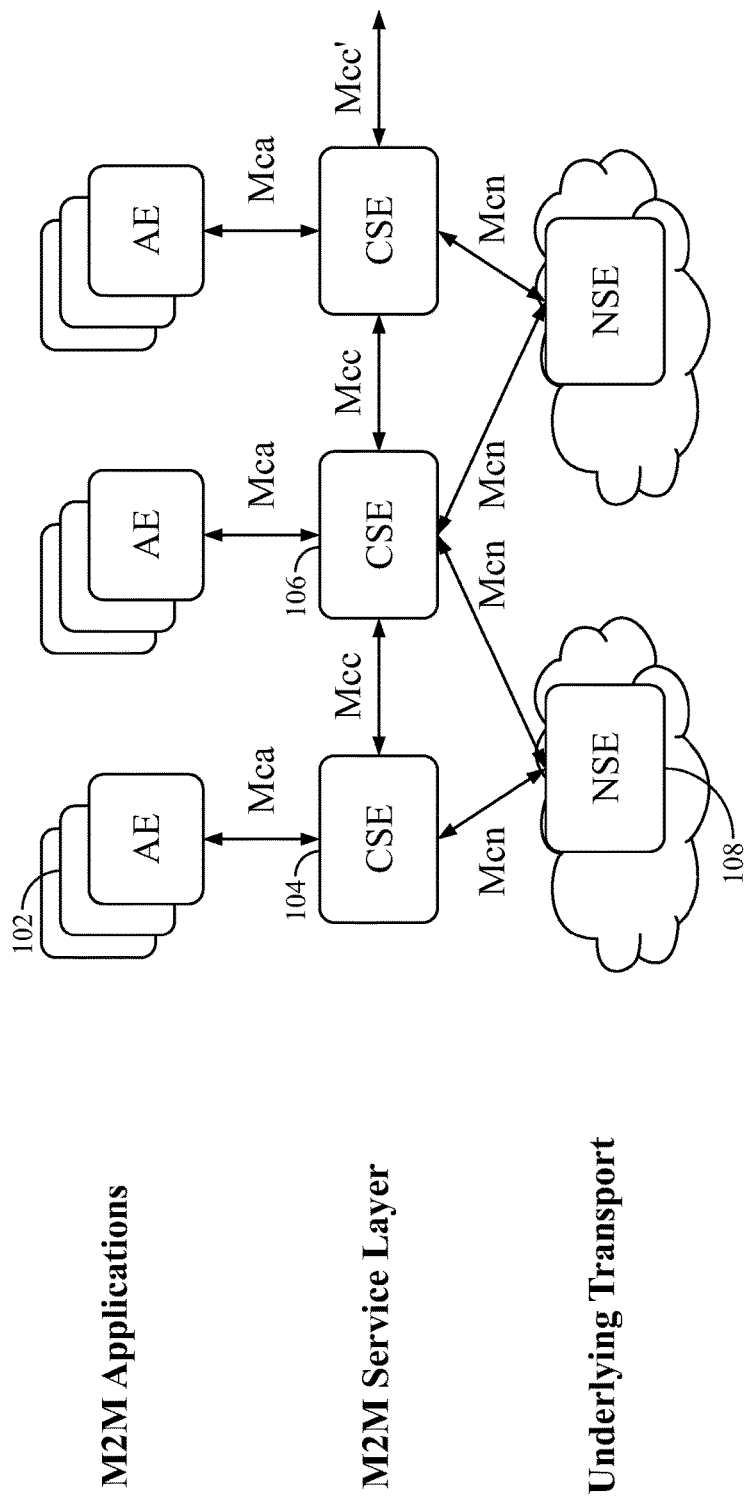
FIG. 1 is a diagram that illustrates common functions of the one M2M service layer.
Figure 2:
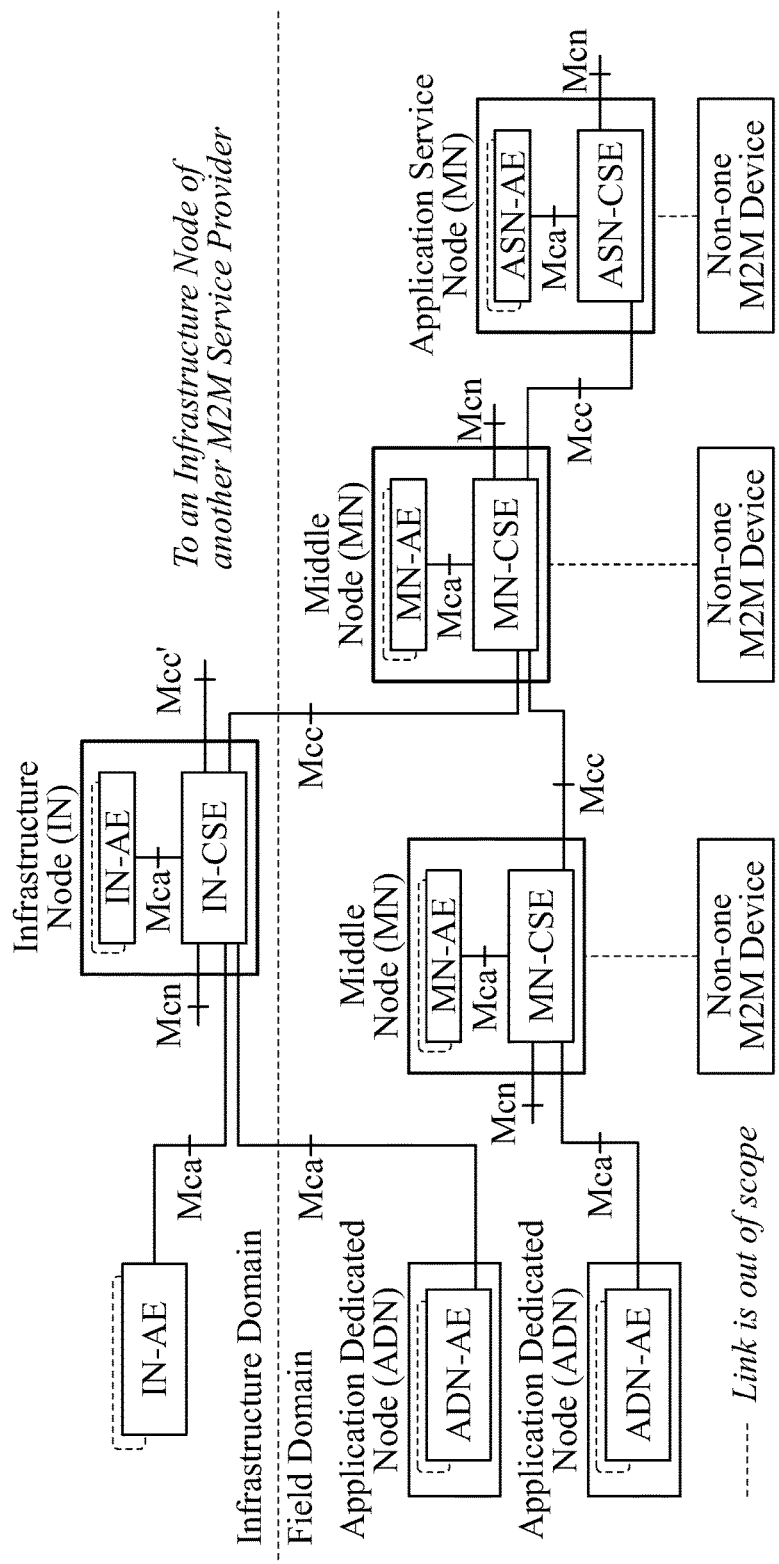
FIG. 2 is a diagram of a oneM2M architecture that supports various types of node configurations.
Figure 3:
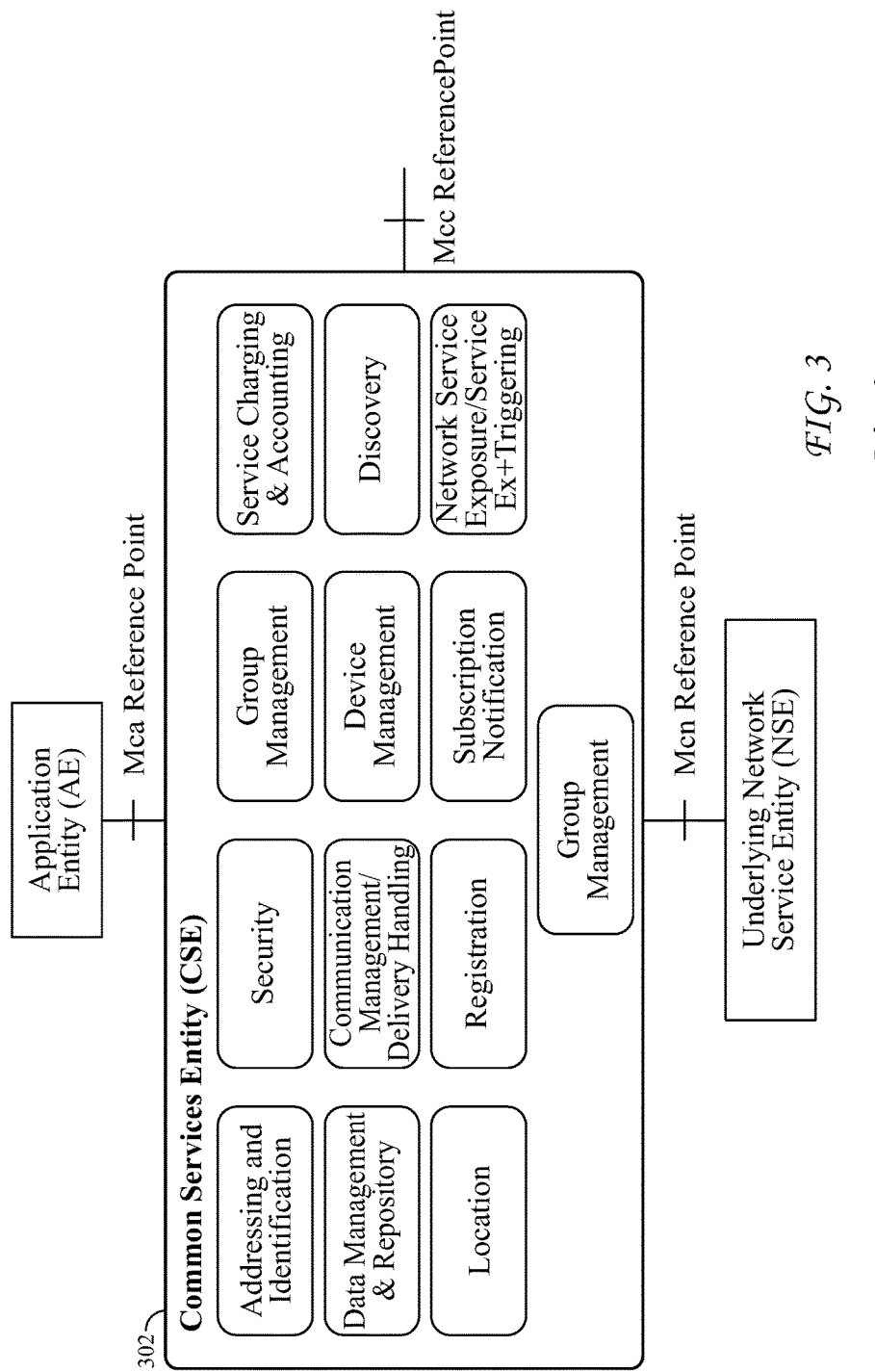
FIG. 3 is a diagram that illustrates an initial set of common service functions (CSF) performed by the oneM2M CSE.
Figures 4, 5:
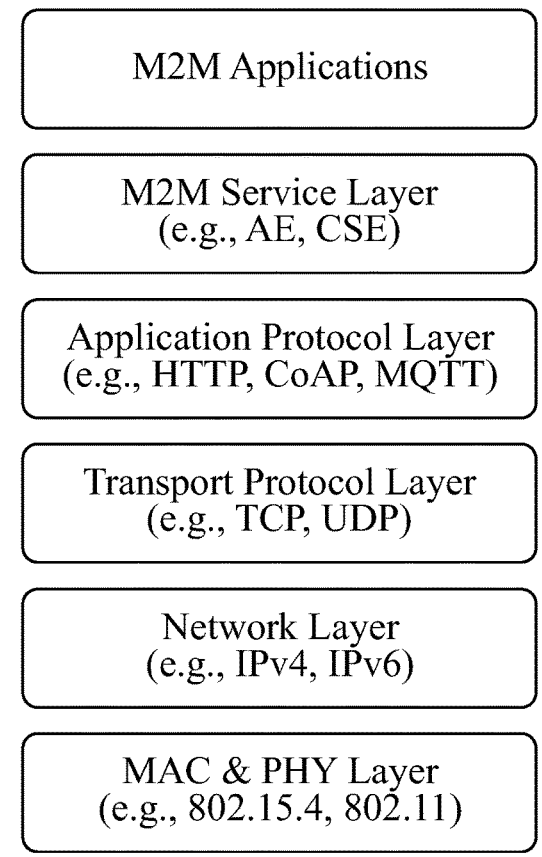
FIG. 4 is a diagram that illustrates the scheme, authority and path components of the Uniform Resource Identifier Generic Syntax that are significant in oneM2M addressing
FIG. 5 is a diagram that illustrates an example Service Layer Protocol stack.
Figure 6:
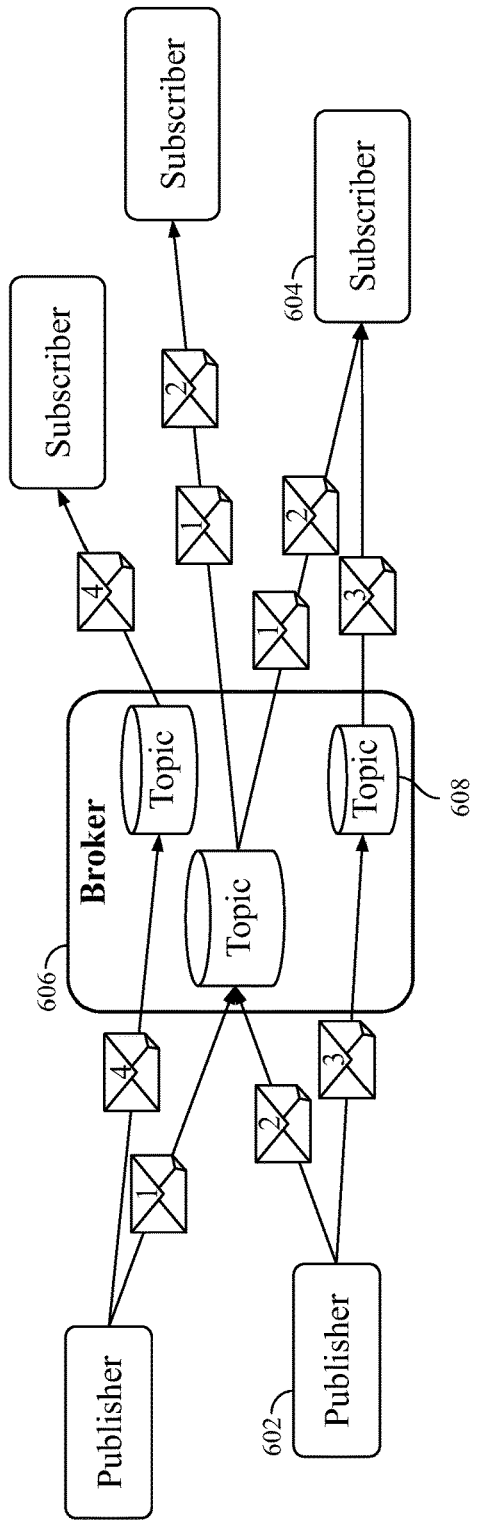
FIG. 6 is a diagram that illustrates the a publish/subscribe (or client/server) model of MQTT
Figure 7:
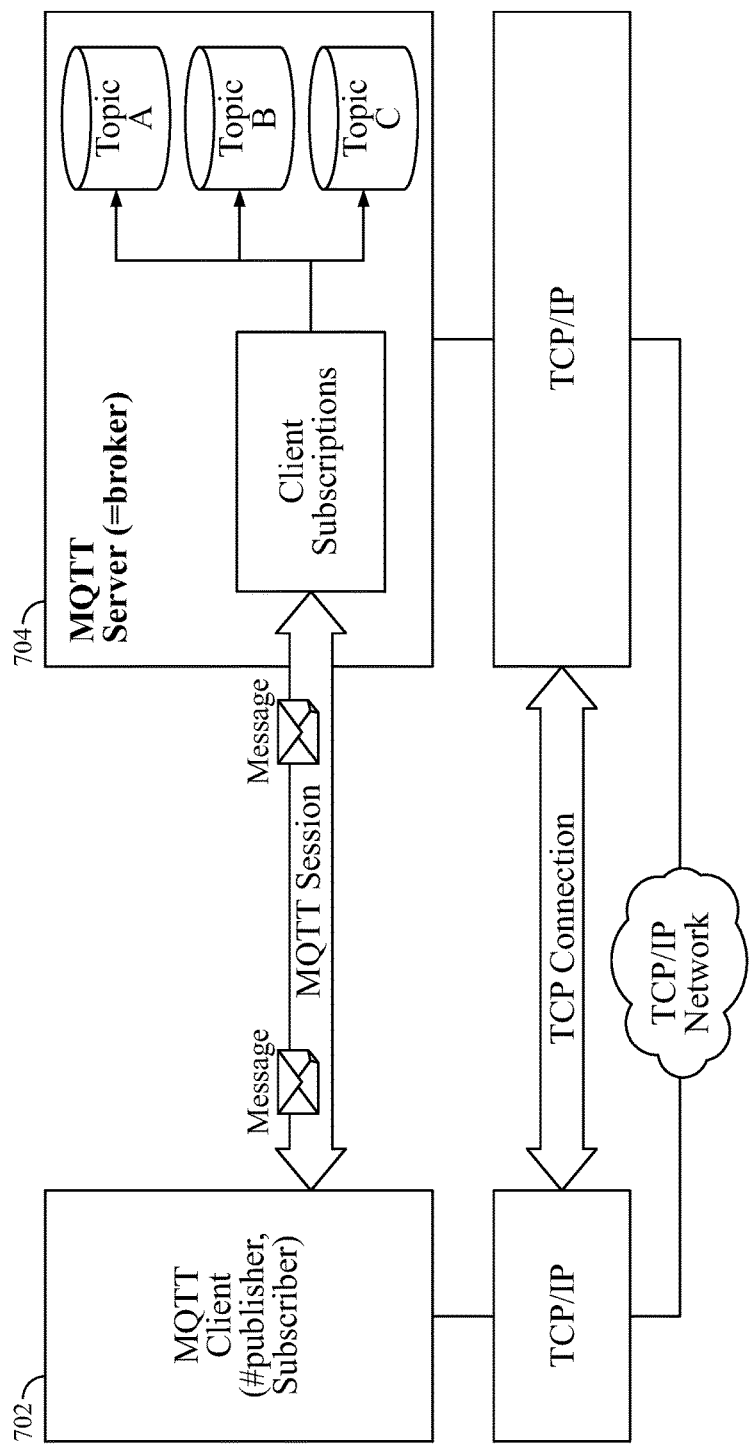
FIG. 7 is a diagram that illustrates the core elements of MQTT.
Figure 8:
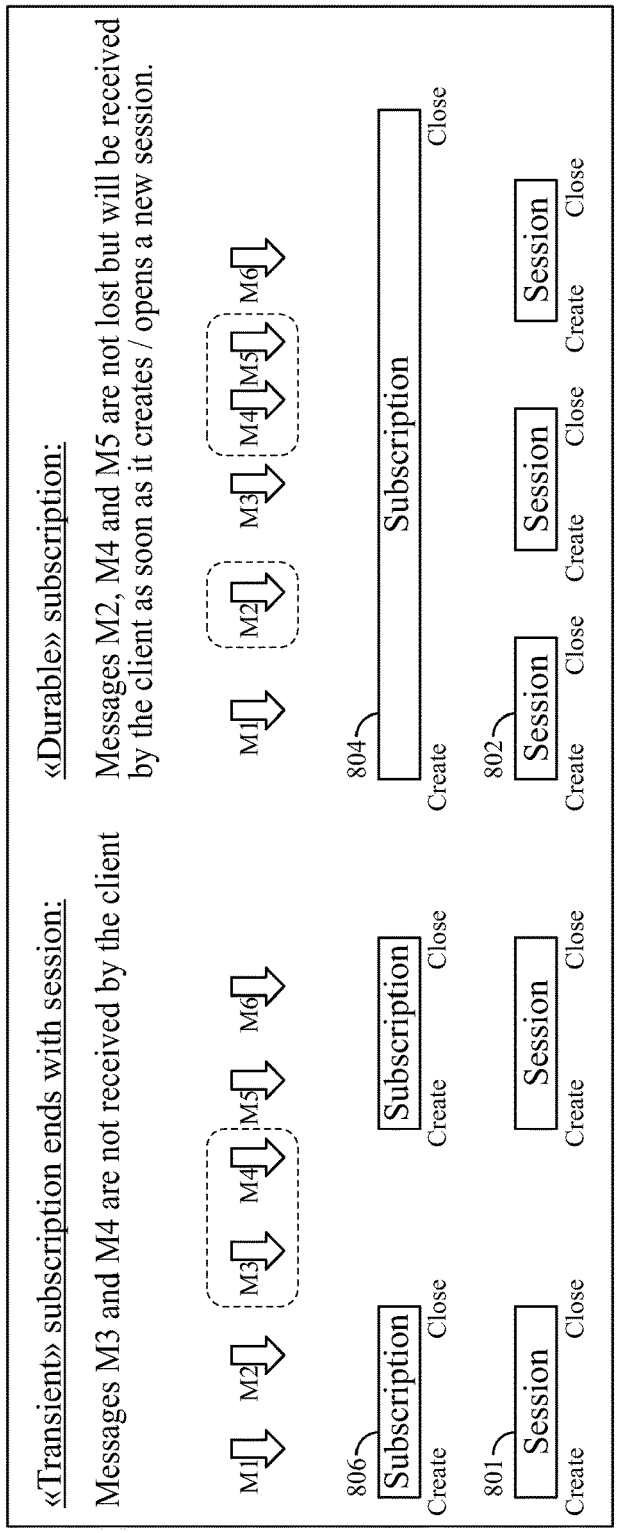
FIG. 8 is a diagram that illustrates sessions and subscriptions that represent two levels of attachment between a Client and a Server in MQTT.
Figure 9:
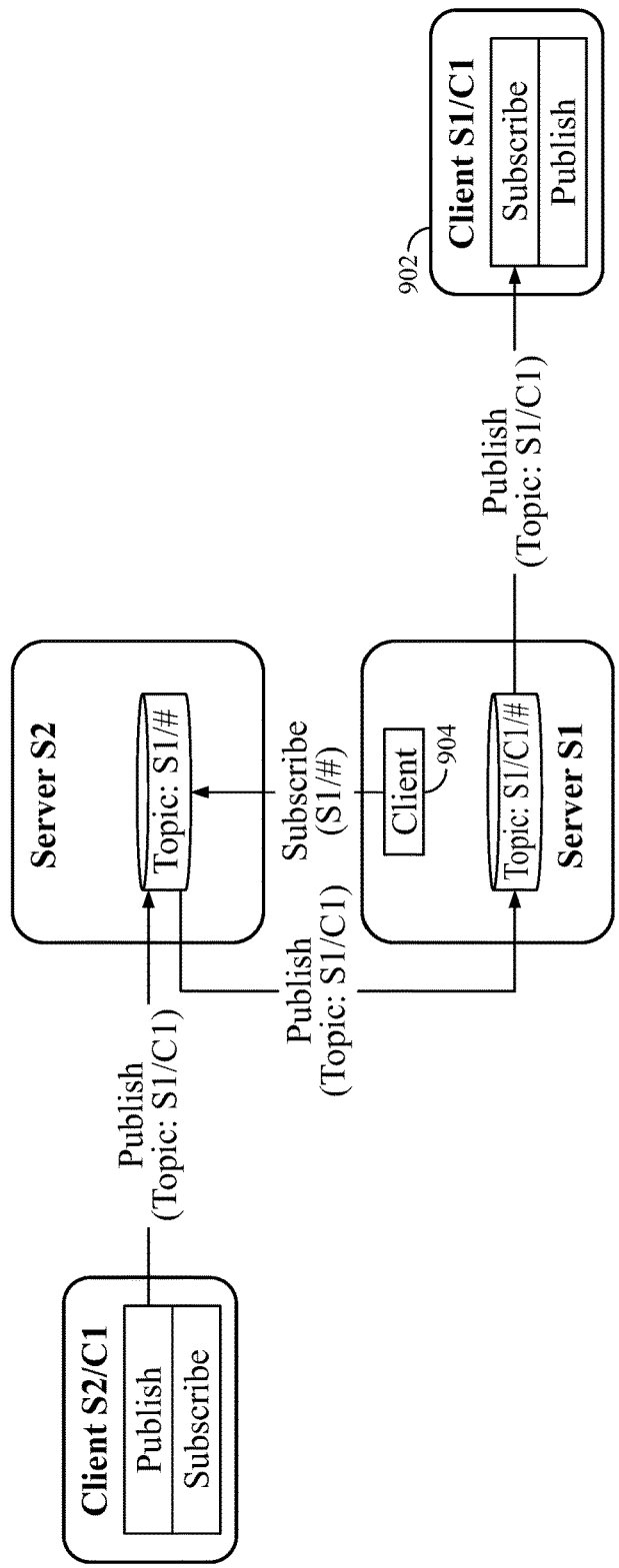
FIG. 9 is a diagram that illustrates a one way flow of messages, between MQTT Servers.
Figure 10:
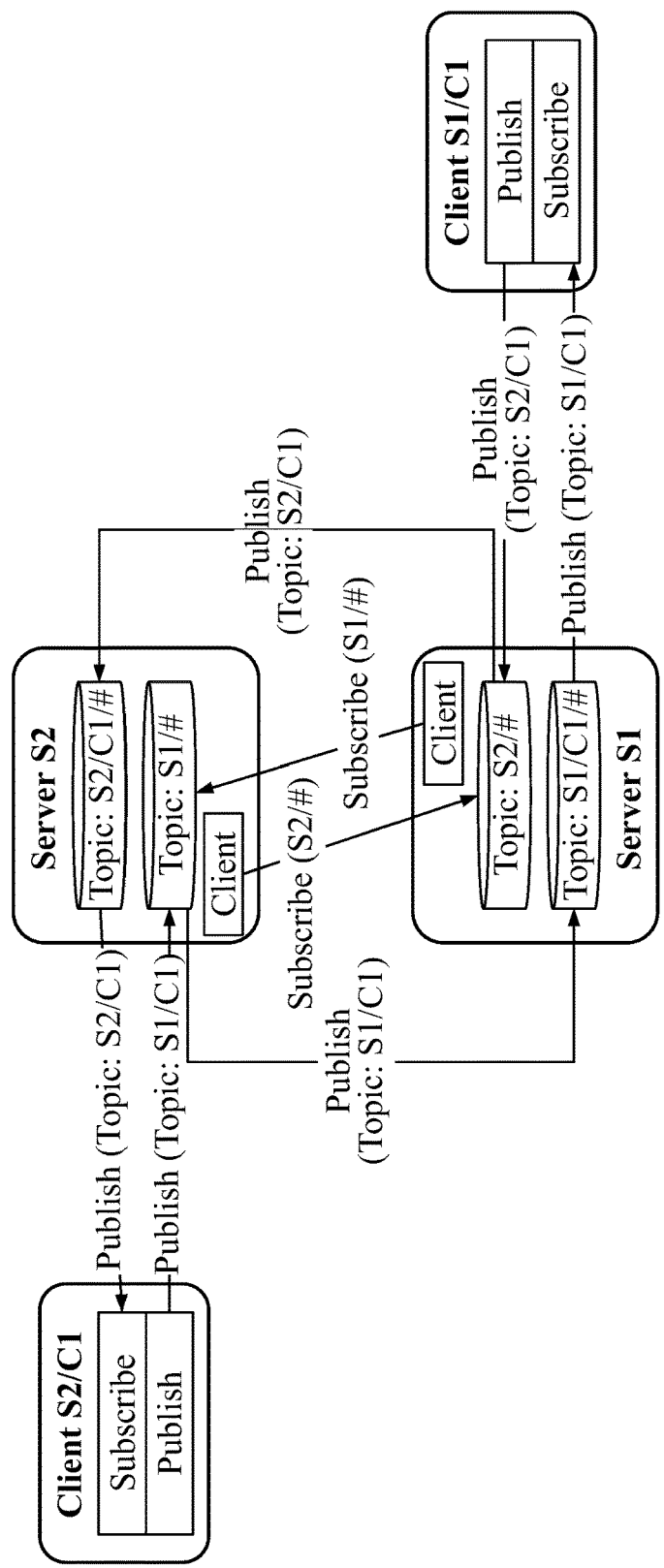
FIG. 10 is a diagram that illustrates bidirectional traffic flow between MQTT servers and Clients connected to either Server.
Figure 11:
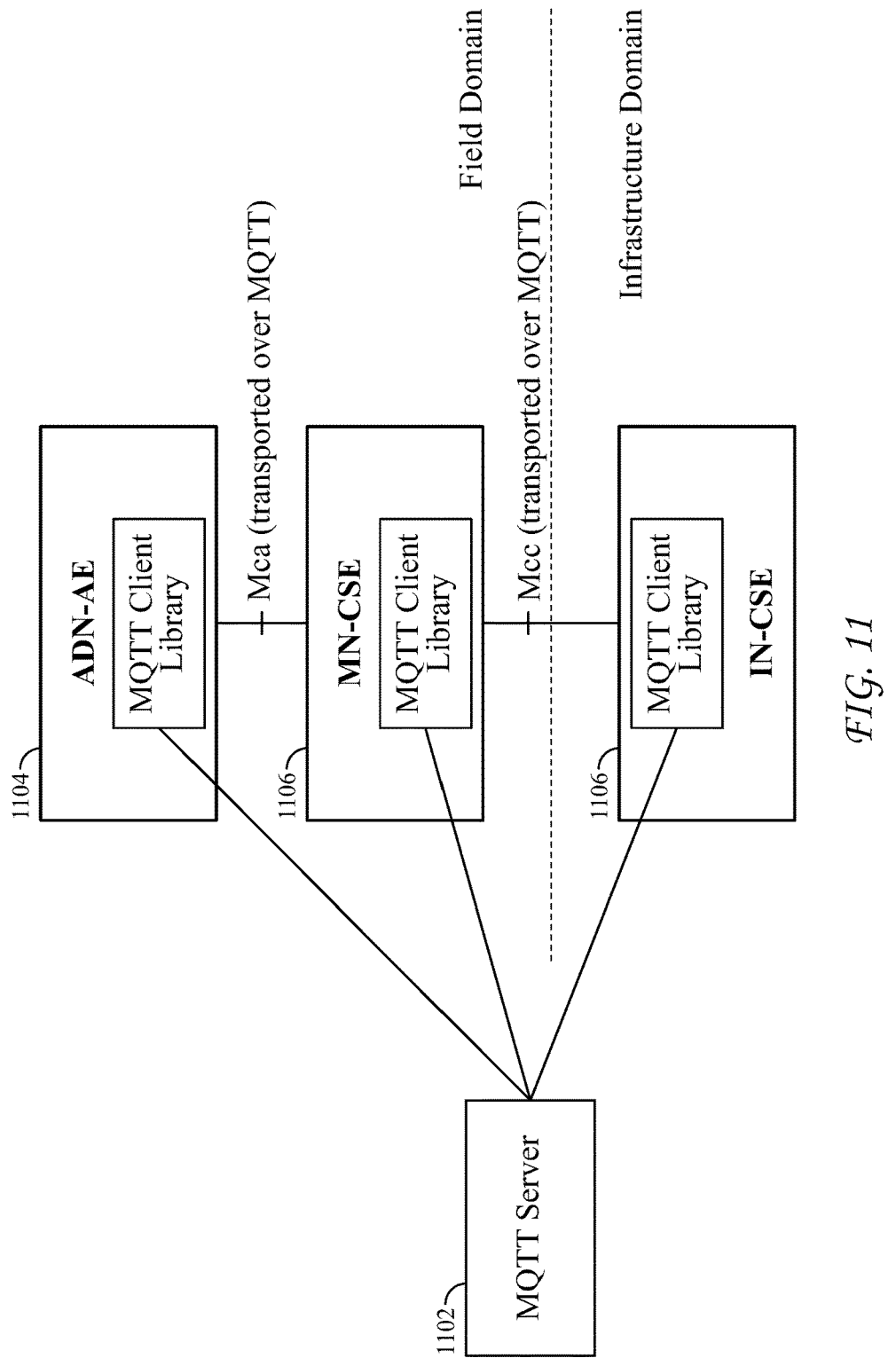
FIG. 11 is a diagram that illustrates a single MQTT Server within a Service Provider domain that maintains connections to every AE and CSE.
Figures 12A, 12B:
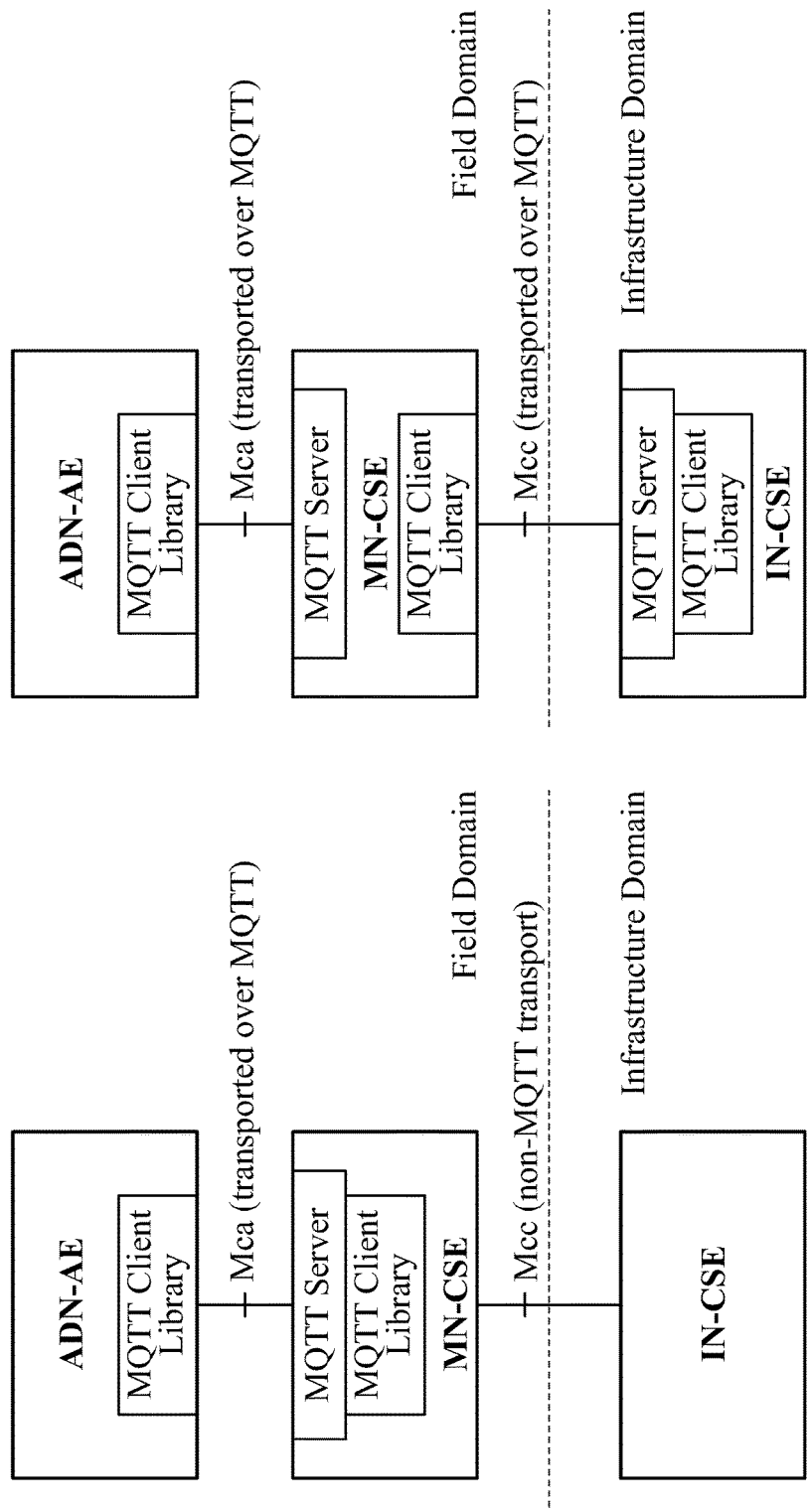
FIGS. 12A and 12B illustrate the use of multiple MQTT servers in a oneM2M embodiment.
Figure 13:
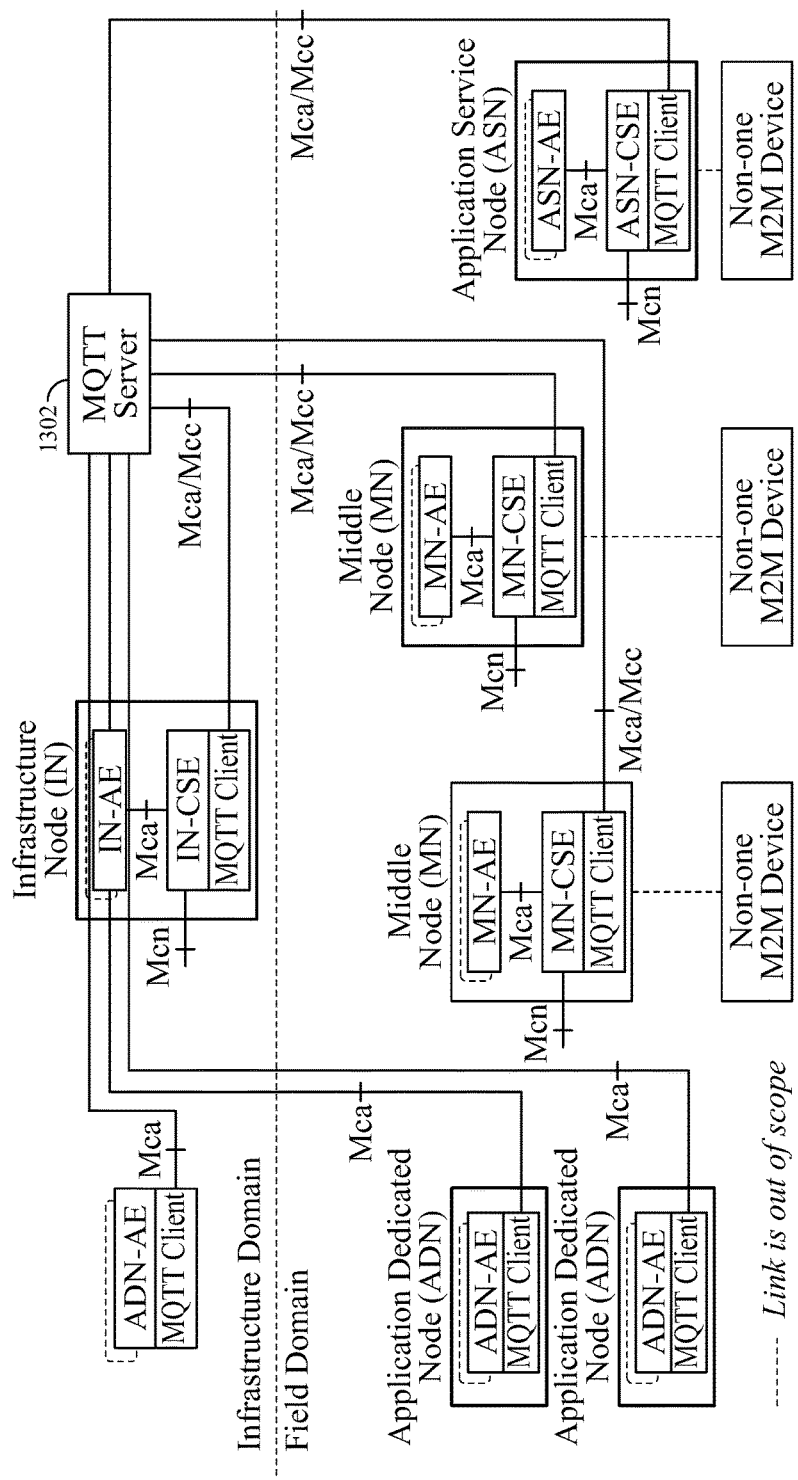
FIG. 13 illustrates a oneM2M embodiment with a MQTT server.

The steps below presuppose connection and subscription of all MQTT Clients (based on corresponding AE-ID or CSE-ID) to a single MQTT Server consistent with the configuration shown in FIG. 13.

In step 1 of FIG. 15, the ADN-AE ("Originator AE") 1502 sends a Service Layer Retrieve Request primitive to the ADN MQTT Client 1504. The "to" parameter of the primitive is the URI for the resource located under <IN CSE-Base>. The "from" parameter is the AE-ID.

In step 2 of FIG. 15, the ADN MQTT Client 1504 issues a PUBLISH message to the (global) MQTT Server 1506. The Topic Name string is set to the Registrar CSE-ID (the MN-CSE where the AE registered).

In step 3 of FIG. 15, the MQTT Server compares the received Topic Name string to its subscription list and finds a match for the MN-CSE-ID. The MQTT Server 1506 forwards the PUBLISH message to the corresponding MQTT Client 1504.

In step 4 of FIG. 15, the MN MQTT Client 1504 delivers the received payload (i.e., the Retrieve Request primitive) to the MN-CSE 1508 (Registrar CSE).

In step 5 of FIG. 15, the MN-CSE 1508 examines the "to" parameter of the Retrieve Request and determines that the primitive is addressed to a different CSE.

In step 6 of FIG. 15, the MN-CSE 1508 updates the "from" parameter to its own CSE-ID and forwards the updated primitive to the MN MQTT Client 1510.

In step 7 of FIG. 15, the MN MQTT Client 1510 issues a PUBLISH message to the MQTT Server 1506. The Topic Name string is set to the Target CSE-ID 1512 (the IN-CSE where the resource is located).

In step 8 of FIG. 15, the MQTT Server 1506 compares the received Topic Name string to its subscription list and finds a match for the IN-CSE-ID. The MQTT Server 1506 forwards the PUBLISH message to the corresponding MQTT Client.

In step 9 of FIG. 15, the IN MQTT Client delivers the received payload (i.e., the Retrieve Request primitive) to the IN-CSE 1512 (Target CSE).

In step 10 of FIG. 15, the specified resource content is retrieved (if the Originator AE 1502 has access rights).

In step 11 of FIG. 15, the IN-CSE 1512 sends a Retrieve Response primitive to the IN MQTT Client 1514 indicating the success or failure of the operation. The "to" parameter of the outgoing primitive is set to the received "from" parameter (MN-CSE-ID). The "cn" parameter is set to the appropriate content; in the success case (shown) it is set to the requested content of the retrieved resource.

In step 12 of FIG. 15, the IN MQTT Client 1514 issues a PUBLISH message to the MQTT Server. The Topic Name string is set to the Receiving CSE-ID (the MN-CSE 1508 identified in the "from" parameter).

In step 15 of FIG. 15, the MQTT Server 1506 compares the received Topic Name string to its subscription list and finds a match for the MN-CSE-ID. The MQTT Server 1506 forwards the PUBLISH message to the corresponding MQTT Client.

In step 14 of FIG. 15, the MN MQTT Client 1510 delivers the received payload (i.e., the Retrieve Response primitive) to the MN-CSE 1508.

In step 15 of FIG. 15, the MN-CSE 1508 examines the Retrieve Response and correlates it to the corresponding Retrieve Request.

In step 16 of FIG. 15, the MN-CSE 1508 updates the "to" parameter to the Originator AE-ID and forwards the updated Retrieve Response primitive to the MN MQTT Client 1510.

In step 17 of FIG. 15, the MN MQTT Client 1510 issues a PUBLISH message to the MQTT Server 1506. The Topic Name string is set to the Originator AE-ID (which originated the request).

In step 18 of FIG. 15, the MQTT Server 1506 compares the received Topic Name string to its subscription list and finds a match for the AE-ID. The MQTT Server 1506 forwards the PUBLISH message to the corresponding MQTT Client.

In step 19 of FIG. 15, the ADN MQTT Client 1504 delivers the received payload (i.e., the Retrieve Response primitive) to the AE 1502.

The MQTT V3.1.1 specification [2] contains the following statements:

Server implementations MAY use Topic Names that start with a leading $ character for other purposes.

$SYS/ has been Widely Adopted as a Prefix to Topics that Contain Server-Specific Information or Control APIs.

This characteristic of MQTT is exploited herein to create a topic space specific to a oneM2M embodiment, for the purpose of assigning an AE-ID value to an AE prior to performing the AE Registration procedure. Specifically, the Topic Name string "$SYS/oneM2M/AE ID/" is used by a MQTT Server+ implementation as a flag to identify an MQTT Client that attempts to connect to the MQTT Server+ using a null Client Identifier (ClientId). This flag triggers a series of actions outlined in FIG. 18 that result in the pre-assignment of an AE ID value to the connecting entity. This AE ID value, in turn, is used by the connecting entity to establish a subscription with the MQTT Server+ for purposes of receiving responses from the CSE associated with that Server+. Further detail of this mechanism is provided below.

Figure 22A:
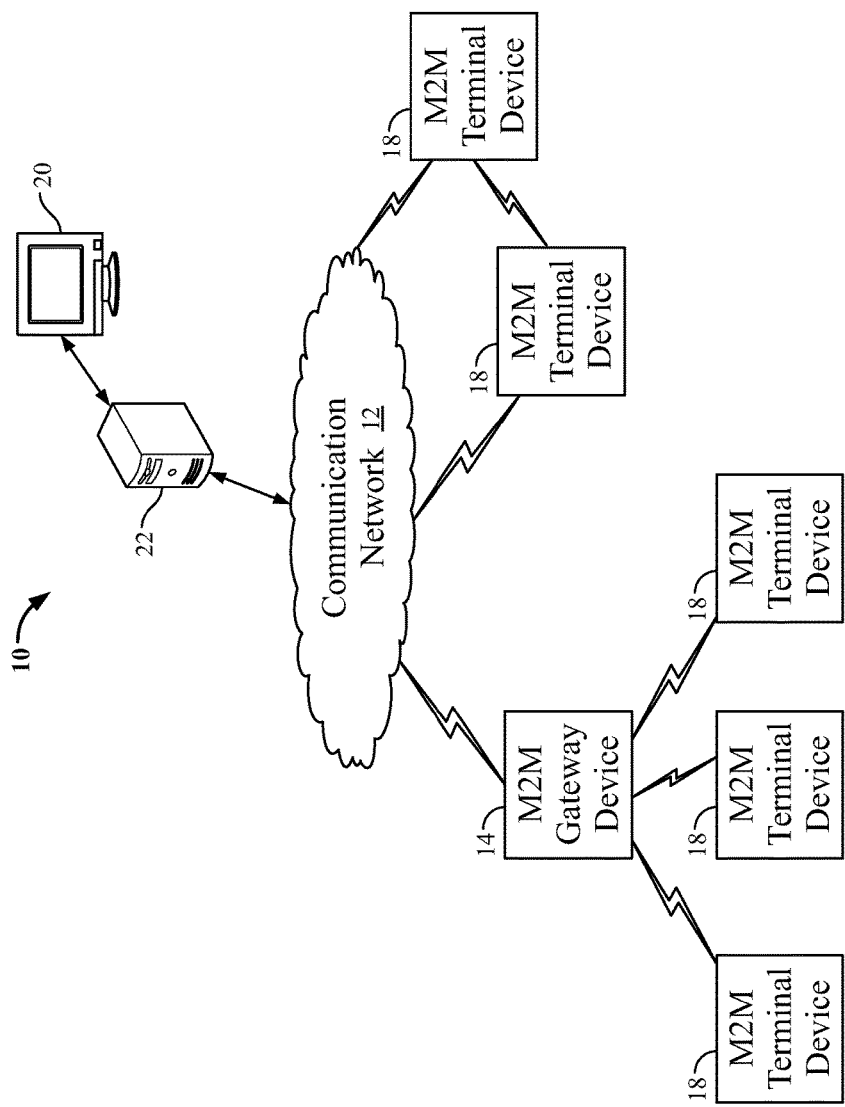
FIG. 22A is a diagram of an example machine-to machine (M2M) or Internet of Things (IoT) communication system in which one or more disclosed embodiments of exemplary systems and methods may be implemented.
Figure 22B:
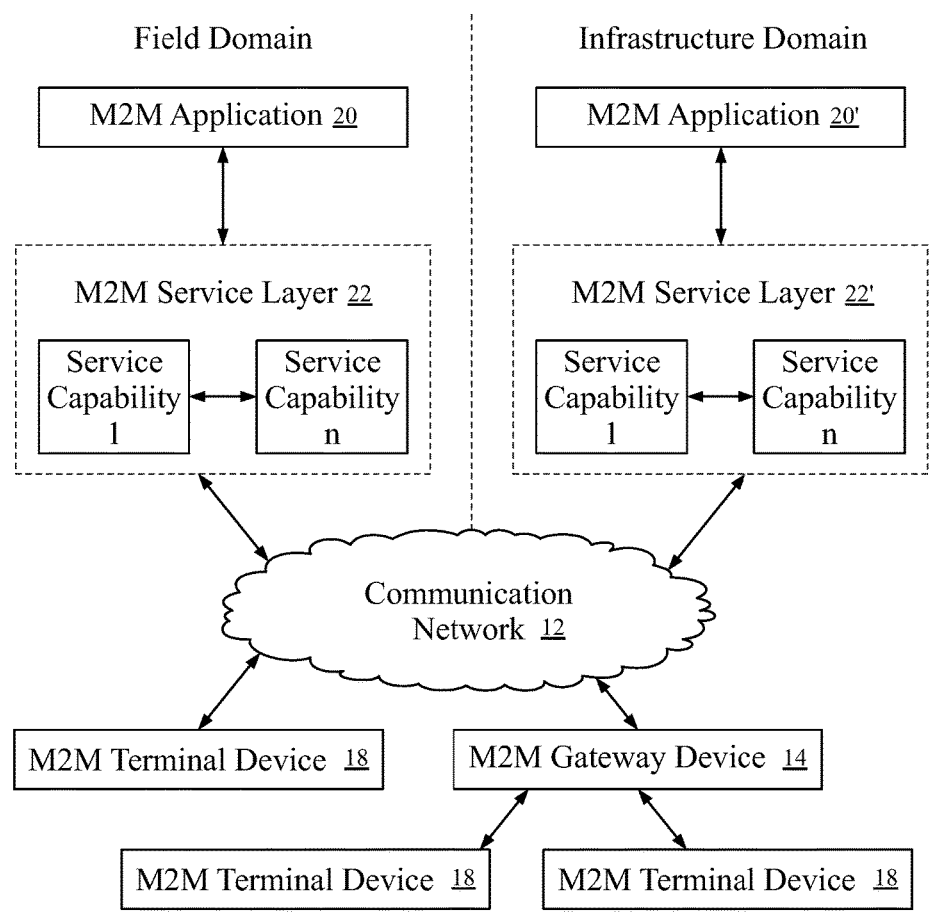
FIG. 22B is a diagram of a M2M service layer with a field domain and infrastructure domain.
Figure 22C:
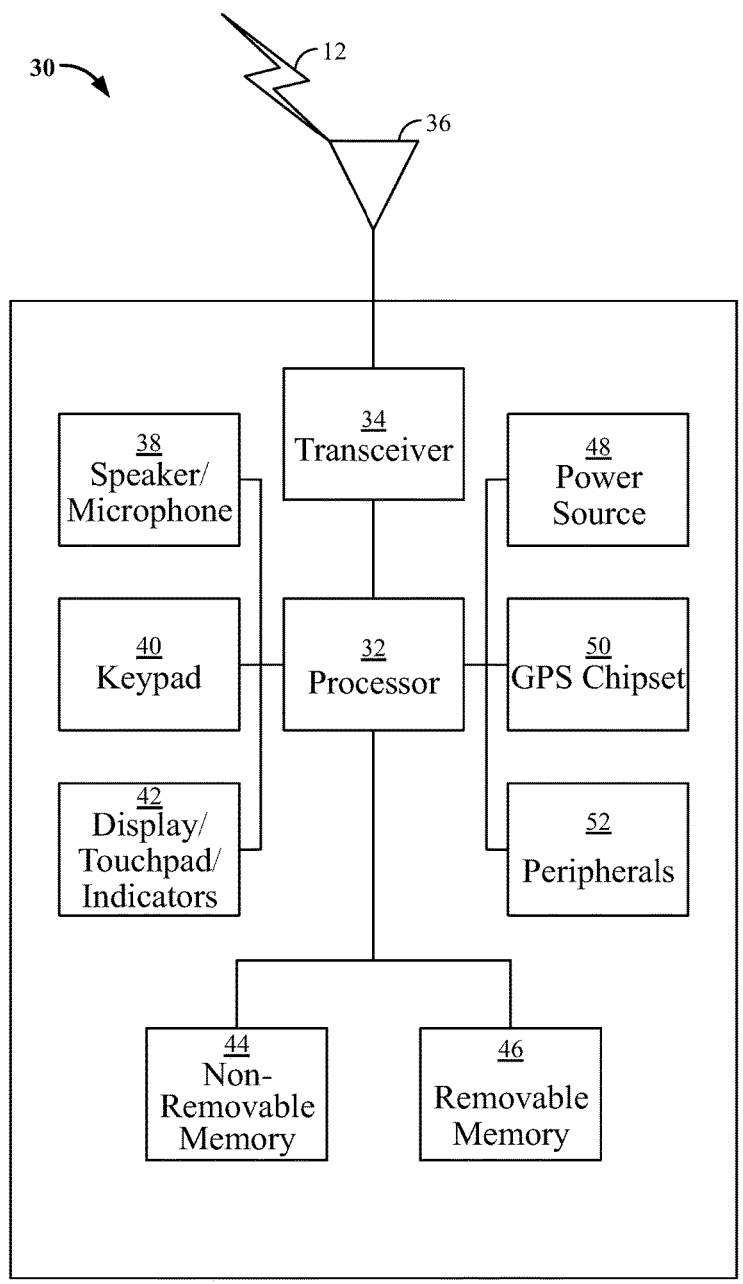
FIG. 22C is a diagram of an exemplary device such as a UE or another end node device.
Figure 22D:
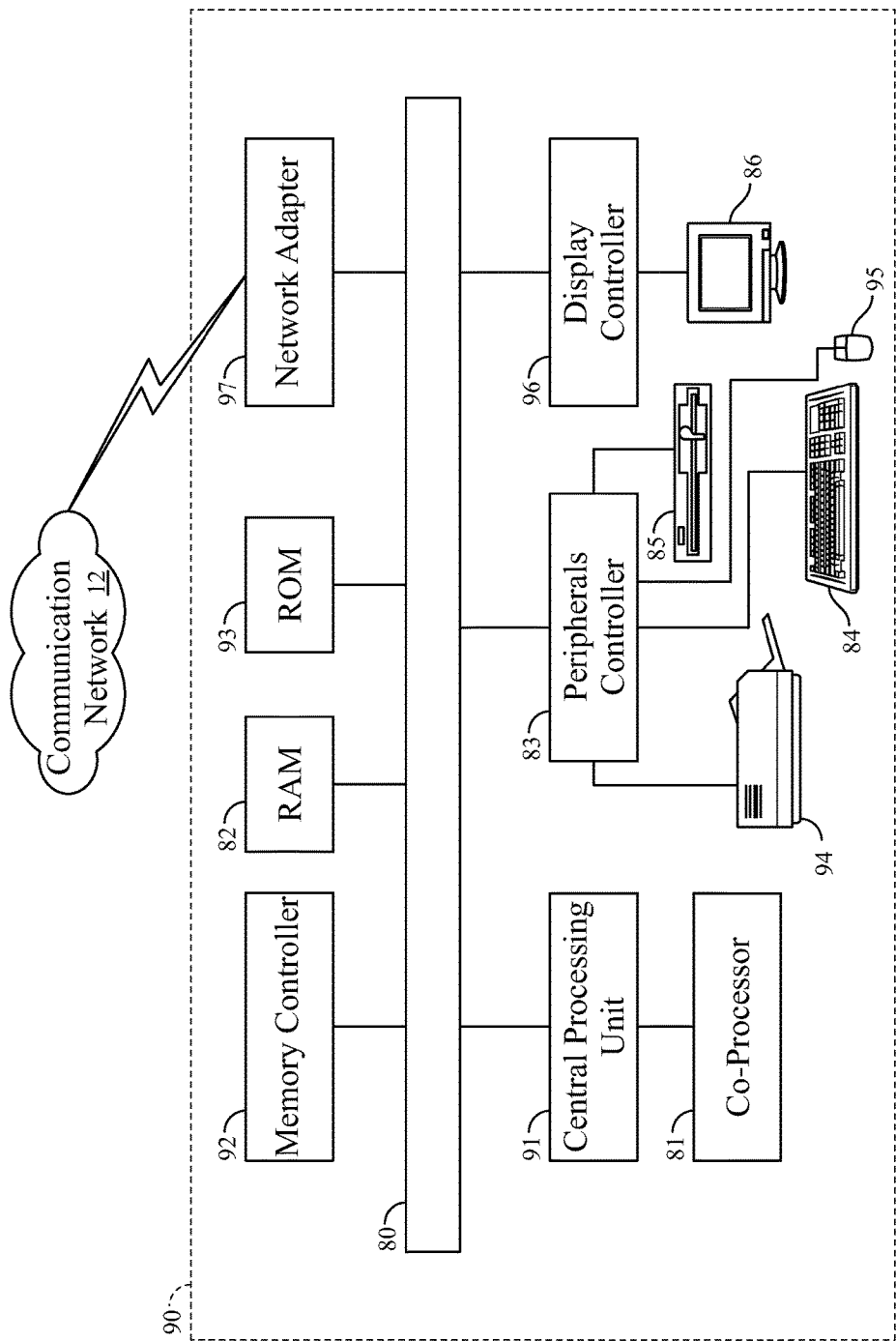
FIG. 22D is a diagram of a computer system or server that may be used to implement nodes or logical entities.

It is understood that the entities performing the steps illustrated in FIG. 15 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 15 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

Figure 16:
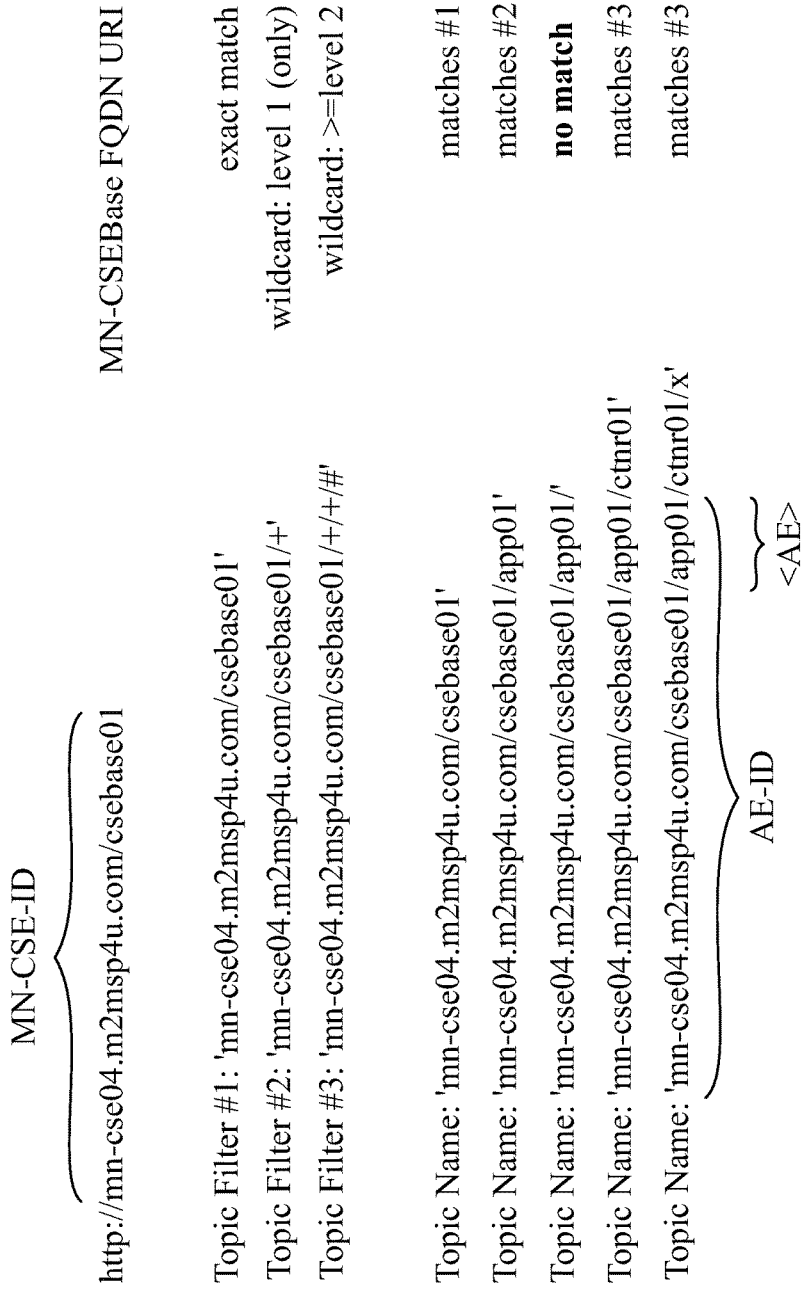
FIG. 16 is a diagram that illustrates the use of three topic filters.
Figure 17:
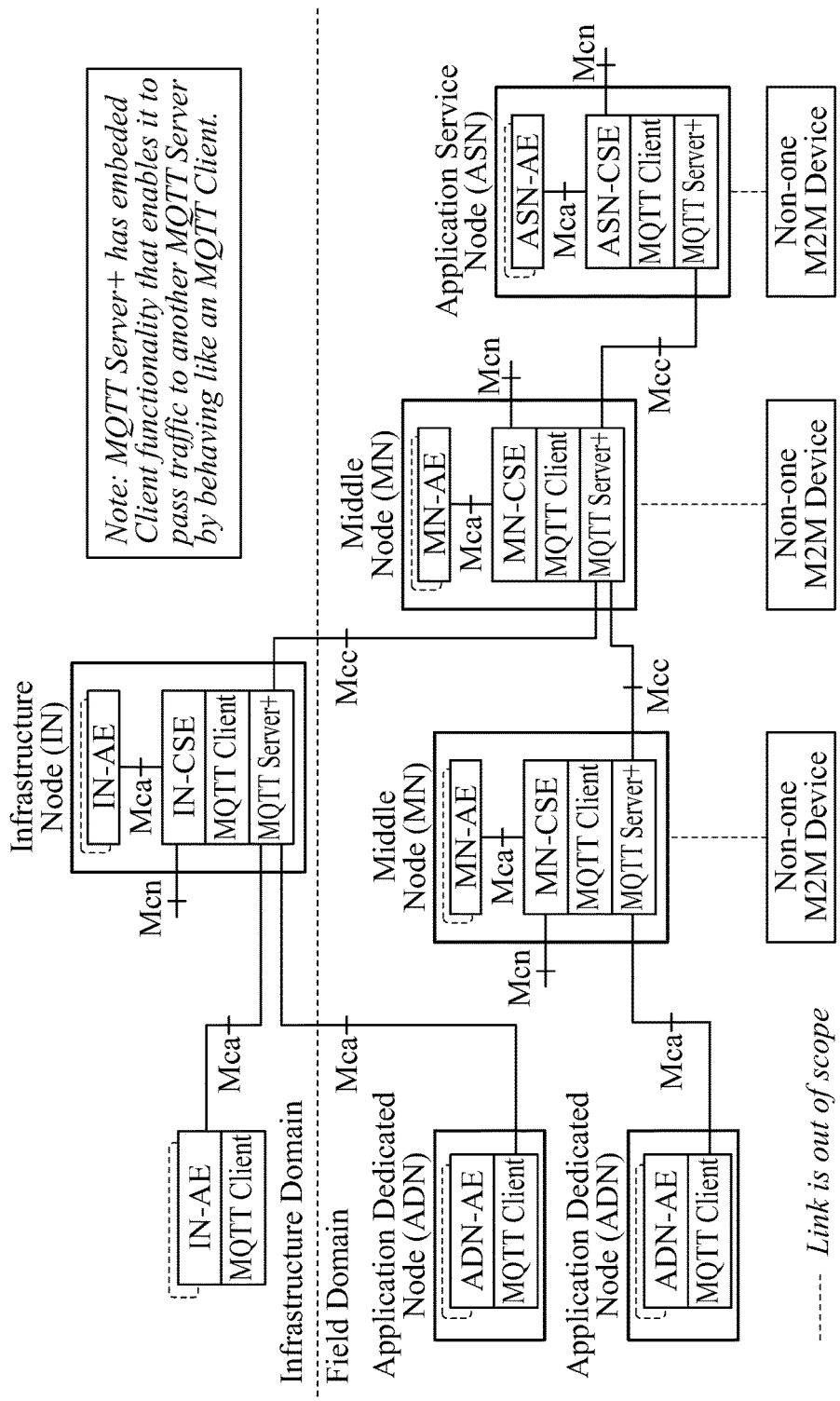
FIG. 17 is a diagram that illustrates a oneM2M embodiment with MQTT.

FIG. 16 is a diagram that illustrates the use of three topic filters. MQTT wildcard characters are exploited to enable an entity sending a request to receive response traffic via a set of subscriptions based on its resource address. The three Topic Filter strings in FIG. 16 cause all messages with a Topic Name containing MN-CSE-ID to be forwarded to the MQTT Client on the MN, with the exception of a Topic Name string with a trailing slash at the first level below CSEBase. Thus, an AE can register with a CSE and receive incoming messages at the URI that corresponds to its AE Identifier (AE-ID) with "/" appended—all other messages with a Topic Name formed around that CSEBase will be routed to the CSE itself. In this way CRUD operations on the AE resource will be delivered to the CSE for action, but there is still a path for messages to reach the AE itself.

MQTT strings are case-sensitive, but the scheme and host components of the RFC 3968 URI are case-insensitive.

Therefore, care must be taken to ensure that the case-sensitive MQTT Topic Name and Topic Filter strings correlate properly with URI values (e.g., host component) used for routing purposes.

oneM2M Functional Architecture updated to reflect the presence of the MQTT Server+ functional entity collocated with each occurrence of a CSE. Such an embodiment would make use of the bidirectional interworking capability described below to enable traffic flow between cooperating Servers as shown in the figure. FIG. 13 shows an alternate view on placing the MQTT Server, which represents the present approach in oneM2M.

The next two figures illustrate sample communication flows involving an ADN-AE 1802, MN-CSE 1804 and IN-CSE 1806 where the CSEs 1804 and 1806 have been enhanced with MQTT Server+ functionality. Although only the Create and Retrieve Service Layer operations are shown, the methods illustrated herein apply equally to the entire suite of CRUD-SN operations: Create, Retrieve, Update, Delete, Subscribe and Notify. These operations (or "primitives") are carried entirely within the Payload parameter of the MQTT PUBLISH message; this is shown in the "Operation" portion of the figures.

Figure 18A:
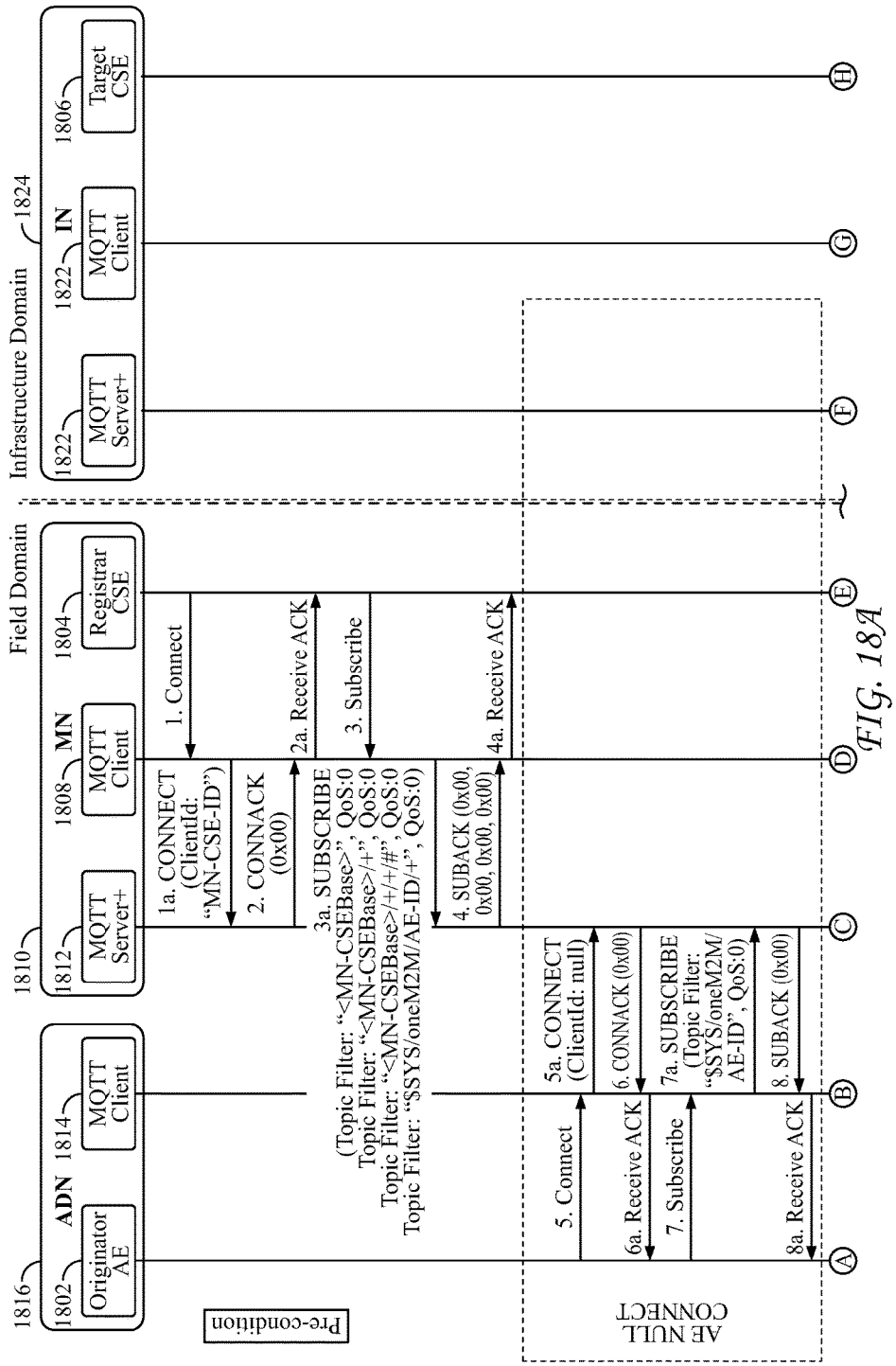
FIGS. 18A, 18B, and 18C depict a flow diagram that illustrates an example of a create service layer operation.
Figure 18B:
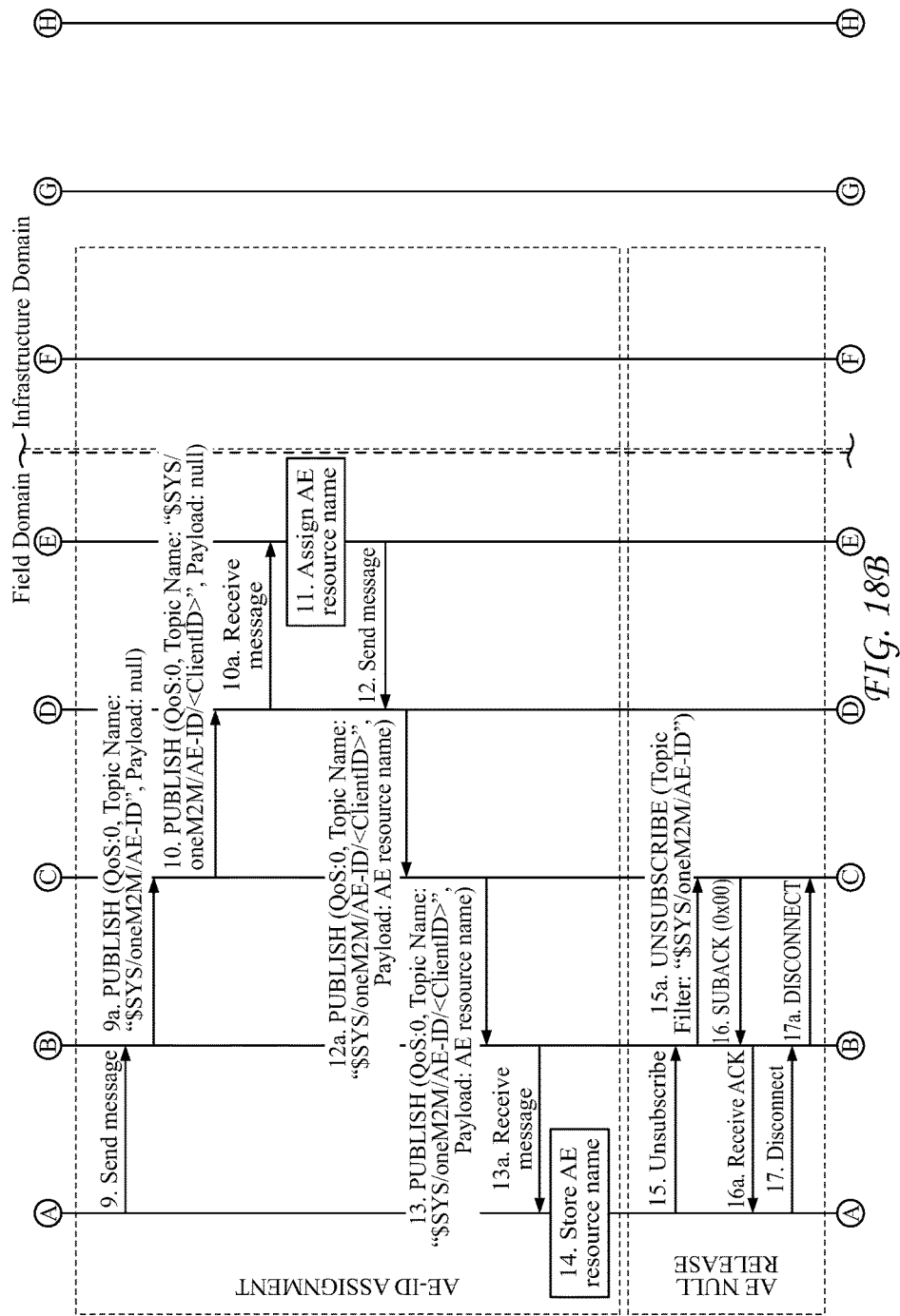
Figure 18C:
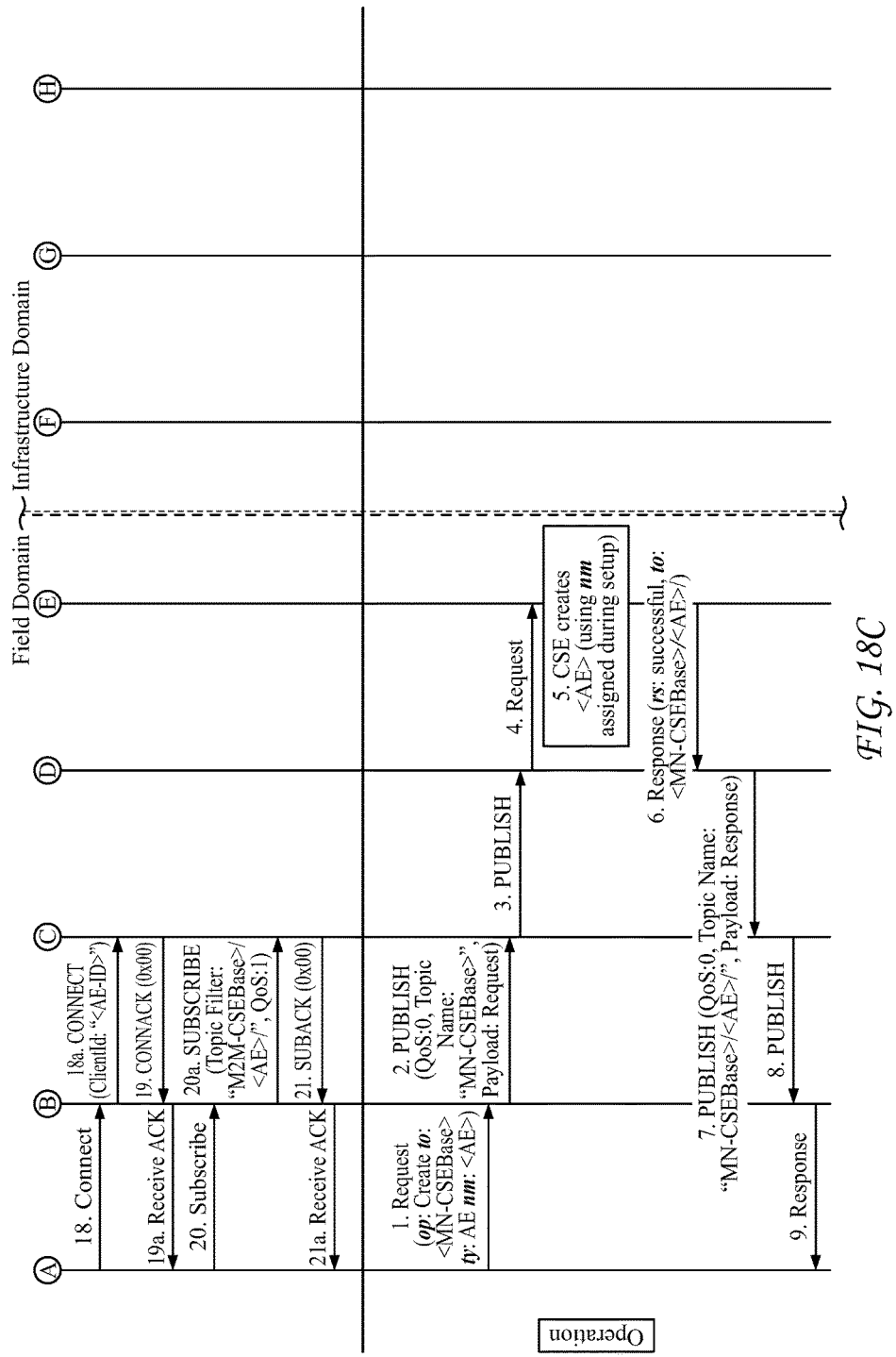

FIG. 18 is a flow diagram that illustrates an example of a create service layer operation The Pre-condition Steps of FIG. 18.

These steps are performed as part of system initialization or whenever network connections between nodes must be (re)established. Where QoS levels are shown in FIG. 18 they are set to level 0 for purposes of illustration. In practice the techniques described are independent of the QoS level used. In pre-condition step 1 of FIG. 18, the MN-CSE 1804 directs the MQTT Client 1808 on the Middle Node (MN) 1810 to issue a CONNECT message to the MQTT Server+ 1812 associated with that MN. The MN CSE Identifier—which is unique across the M2M Service Provider domain—is used as the ClientID parameter in the CONNECT message (ClientID must be unique across all connections to that MQTT Server+).

In pre-condition step 2 of FIG. 18, the MQTT Server+ 1812 responds with a CONNACK message indicating the connection was accepted.

In pre-condition step 3 of FIG. 18, the MN-CSE 1804 directs the MN MQTT Client 1808 to issue a SUBSCRIBE message to the MN MQTT Server+ 1812. The MN-CSE-ID is used to form the Topic Filter parameter in the SUBSCRIBE message. Four separate Topic Filter strings are included in this parameter: The first three strings cause traffic addressed to the MN-CSE 1804 to be routed toward it. The fourth string is the system-specific value, "$SYS/oneM2M/AE-ID/+". A Client publishing to this topic is signaling the Server+/Registrar CSE of a request for pre-assignment of an <AE> resource name value (which the Client can then use to "self-subscribe" prior to initiating contact with the Registrar CSE). See Section In pre-condition step 4 of FIG. 18, the MQTT Server+ 1812 responds with a SUBACK message indicating each of the four subscription requests was received and processed.

AE Null Connect

In pre-condition step 5 of FIG. 18, the MQTT Client 1814 on the Application Dedicated Node (ADN) 1816 is directed by the ADN-AE 1802 ("Originator AE") to issue a CONNECT message to the MQTT Server+ 1812 associated with its Registrar CSE 1804 (the address of this MQTT Server+ 1812 is preconfigured). The Client Identifier (ClientID) parameter is null (length of zero bytes).

In pre-condition step 6 of FIG. 18, the MQTT Server+ 1812, as the result of receiving a null ClientID, assigns a unique ClientID value for this session and responds with a CONNACK message indicating the connection was accepted.

In pre-condition step 7 of FIG. 18, the ADN-AE 1802 directs the ADN MQTT Client 1814 to issue a SUBSCRIBE message to the MQTT Server+ 1812 of the Registrar CSE 1804. The Topic Filter parameter is a system-specific string, "$SYS/oneM2M/AE-ID" that represents a Subscription associated with a request for pre-assignment of an <AE> resource name.

In pre-condition step 8 of FIG. 18, the MQTT Server+ 1812 responds with a SUBACK message indicating the subscription request was received and processed. The MQTT Server+ 1812 creates a Subscription filter for the Client by appending the special character "/" and the ClientID value for this session to the received Topic Filter string, "$SYS/oneM2M/AE-ID".

AE-ID Assignment

In pre-condition step 9 of FIG. 18, the ADN-AE 1802 directs the ADN MQTT Client 1814 to issue a PUBLISH message to the MQTT Server+ 1812 of the Registrar CSE 1804. The Topic Name parameter is a system-specific string, "$SYS/oneM2M/AE-ID", that represents a flag for pre-assignment of an <AE> resource name by the Registrar CSE 1804. The Payload parameter is null (length of zero bytes).

In pre-condition step 10 of FIG. 18, the MQTT Server+ 1812 of the MN-CSE 1804 (Registrar CSE), upon receiving the PUBLISH message with the system-specific Topic Name string "$SYS/oneM2M/AE-ID", appends the special character "/" and the ClientID value for this session to it. The modified Topic Name string is a match for the Subscription filter for the MN MQTT Client 1808 from pre-condition step 3 of FIG. 18, so the MQTT Server+ 1812 forwards the modified PUBLISH message to the MN MQTT Client.

The modified Topic Name string is also a match for the Subscription filter for the ADN MQTT Client from pre-condition step 7 of FIG. 18, but the Server+ 1812 does not forward the message in this case because the publisher and subscriber are the same.

In pre-condition step 11 of FIG. 18, the MN-CSE 1804, upon receiving the PUBLISH message with the modified system-specific string from the MN MQTT Client 1808, processes the request and assigns an <AE> resource name value.

In pre-condition step 12 of FIG. 18, the MN-CSE 1804 directs the MN MQTT Client 1808 to issue a PUBLISH message to the associated MQTT Server+. The Topic Name parameter is set to the same system-specific string that was received in the pre-condition step 10 of FIG. 18. The Payload is the (pre-) assigned <AE> resource name.

In pre-condition step 13 of FIG. 18, the MQTT Server+ 1812, upon receiving the PUBLISH message with the modified system-specific Topic Name string, determines that the string is a match for the Subscription filter for the ADN MQTT Client 1814 from the pre-condition step 8 of FIG. 18. The MQTT Server+ 1812 forwards the PUBLISH message to the ADN MQTT Client 1814.

In pre-condition step 14 of FIG. 18, the ADN-AE 1802 stores the Payload parameter as its new <AE> resource name.

AE Null Release

In pre-condition step 15 of FIG. 18, the ADN-AE 1802 directs the ADN MQTT Client to issue an UNSUBSCRIBE message to the MQTT Server+ 1812 of the Registrar CSE 1804. The Topic Filter parameter value used is the same one stored in the pre-condition step 14 of FIG. 18.

In pre-condition step 16 of FIG. 18, the MQTT Server+ 1812 responds with an UNSUBACK message.

In pre-condition step 17 of FIG. 18, the ADN-AE 1802 directs the ADN MQTT Client 1814 to issue a DISCONNECT message to the MQTT Server+ 1812 of the Registrar CSE. The ADN MQTT Client then closes the Network Connection.

In pre-condition step 18 of FIG. 18, the ADN-AE 1802 directs the ADN MQTT Client 1814 to issue a CONNECT message to the MQTT Server+ 1812 function associated with its Registrar CSE 1804. The AE Identifier (AE-ID), or a locally unique relative version based on the <AE> resource name stored in [0124] the pre-condition step 14 of FIG. 18, is used as the ClientID parameter in the CONNECT message.

In pre-condition step 19 of FIG. 18, the The MQTT Server+ 1812 responds with a CONNACK message indicating the connection was accepted.

In pre-condition step 20 of FIG. 18, the ADN MQTT Client 1814 is directed to issue a SUBSCRIBE message to the MQTT Server+ 1812 of the Registrar CSE 1804. The <AE> URI is used to form the Topic Filter parameter in the SUBSCRIBE message. Specifically, the special character "/" is appended to the <AE> URI to produce the Topic Filter string.

In pre-condition step 21 of FIG. 18, the MQTT Server+ 182 responds with a SUBACK message indicating the subscription request was received and processed.

Operation Steps of FIG. 18

In operation step 1 of FIG. 18, the ADN-AE 1802 ("Originator AE") issues a Service Layer Request primitive to the ADN MQTT Client 1814. The op (Operation) parameter is set to "C" (Create). The to parameter of the primitive is the <MN-CSEBase> URI (which is also used as the MQTT Topic Name string). The ty parameter indicates the <AE> Resource Type, which instructs the Registrar CSE to create an <AE> resource for the ADN-AE (i.e., perform application registration). The nm parameter is set to the <AE> resource name value that was received in pre-condition step 14 of FIG. 18.

In operation step 2 of FIG. 18, the ADN MQTT Client 1814 issues a PUBLISH message to the MN MQTT Server+ 1812 (with which it established a connection in).

In operation step 3 of FIG. 18, the MN MQTT Server+ 1812 compares the received Topic Name (the <MN-CSEBase> URI) to its subscription list and finds a match corresponding to the MN MQTT Client 1808 (see pre-conditioned step 3 of FIG. 18 example above). The MN MQTT Server+ 1812 forwards the PUBLISH message to the MN MQTT Client 1808.

In operation step 4 of FIG. 18, the MN MQTT Client 1808 delivers the received payload (i.e., Service Layer Create Request primitive) to the MN-CSE 1804 (Registrar CSE).

In operation step 5 of FIG. 18, the <AE> resource is created under the MN-CSEBase (if the AE is successfully authenticated and has sufficient access rights).

In operation step 6 of FIG. 18, the MN-CSE 1804 sends a Response primitive to the MN MQTT Client 1808 indicating the success or failure of the Create operation in the rs parameter. The to parameter of the outgoing Response primitive is set to the URI of the <AE> resource that was just created. The cn parameter is set to the appropriate content; in the success case (shown) it is set to the URI of the created <AE> resource.

In operation step 7 of FIG. 18, the MN MQTT Client 1808 issues a PUBLISH message to the associated MN MQTT Server+ 1812.

In operation step 8 of FIG. 18, the MN MQTT Server+ 1812 compares the received Topic Name (the <AE> URI) to its subscription list and finds a match corresponding to the ADN MQTT Client 1814. The MN MQTT Server+ 1812 forwards the PUBLISH message to the ADN MQTT Client 1814.

In operation step 9 of FIG. 18, the ADN MQTT Client 1814 delivers the received payload (i.e., Create Response primitive) to the ADN-AE 1802.

One embodiment is a method at an MQTT server, such as MQTT server+ 1812. A publish request is received from an application, such as ADN 1816, that uses a predetermined topic filter parameter related to a request for an application identifier, such as in precondition step 9 of FIG. 18. In response to the predetermined topic filter parameter, a message is published for a registrar CSE 1804 that includes a temporary client ID, such as in pre-condition step 10 of FIG. 18. A message is received from the registrar CSE 1804 that includes an assigned application name as payload such as precondition step 12 of FIG. 18. The assigned application name is provided to the application, such as in precondition step 13 of FIG. 18. A subscription request is received from the application including the assigned application name as part of the topic filter, such as in precondition step 20 of FIG. 18.

Another embodiment is a method at an application, such as ADN 1802. A publish request is sent to an MQTT server, such as MQTT Server+ 1812, that uses a predetermined topic filter parameter related to a request for an application identifier, such as in precondition step 9 of FIG. 18. A message is received from the MQTT server+ 1812 that includes an assigned application name as payload. A subscription request is sent to the MQTT server 1812 including the assigned application name as part of the topic filter, such as in precondition step 20 of FIG. 18.

It is understood that the entities performing the steps illustrated in FIG. 18 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 18 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 18. It is also understood that any transmitting and receiving steps illustrated in FIG. 18 may be performed by communication circuitry of the node under control of the processor of the node and the computer-executable instructions (e.g., software) that it executes.

Figure 19A:
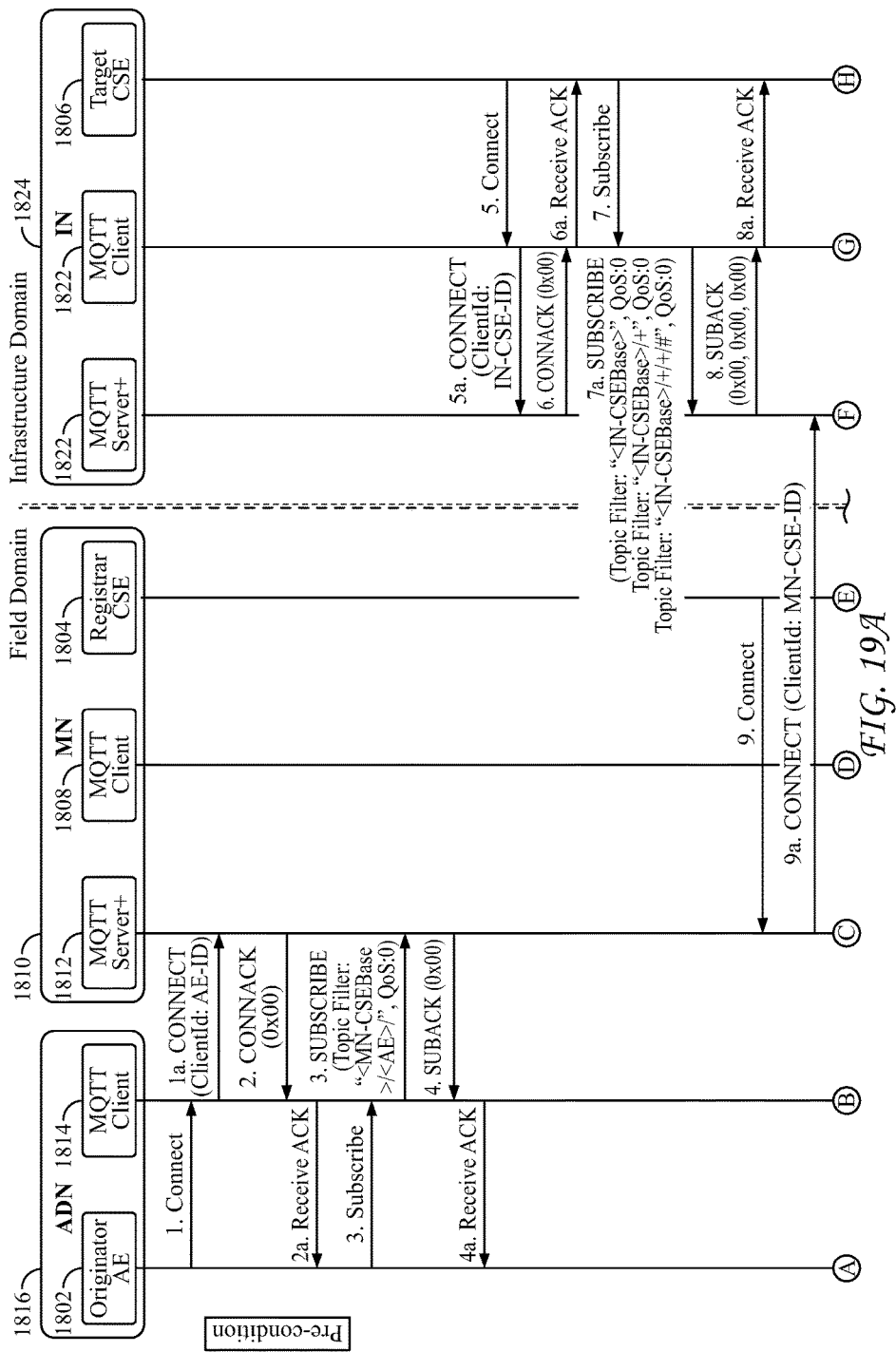
FIGS. 19A, 19B, and 19C depict a flow diagram that illustrates an example of a retrieve service layer operation.
Figure 19B:
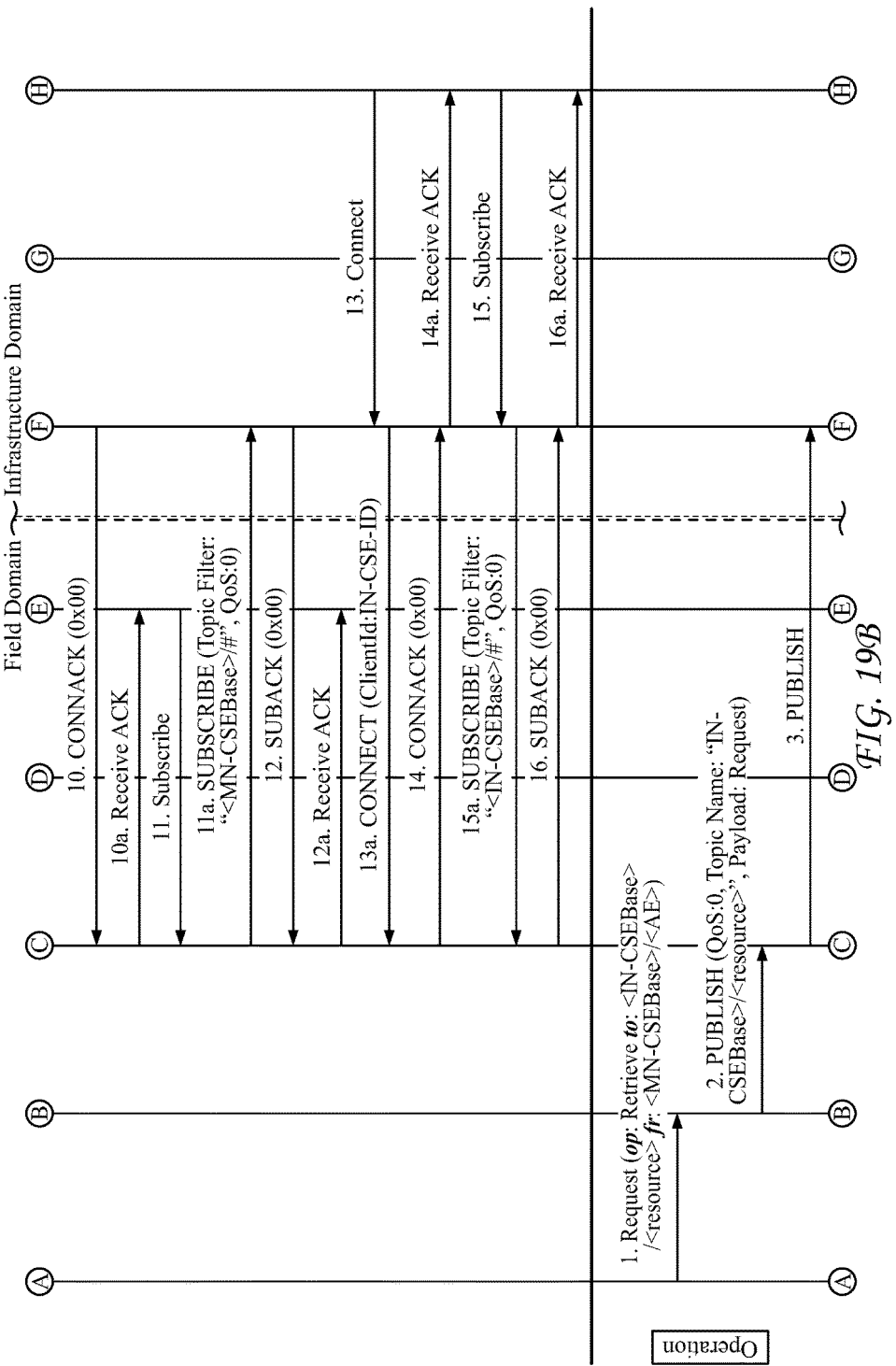
Figure 19C:
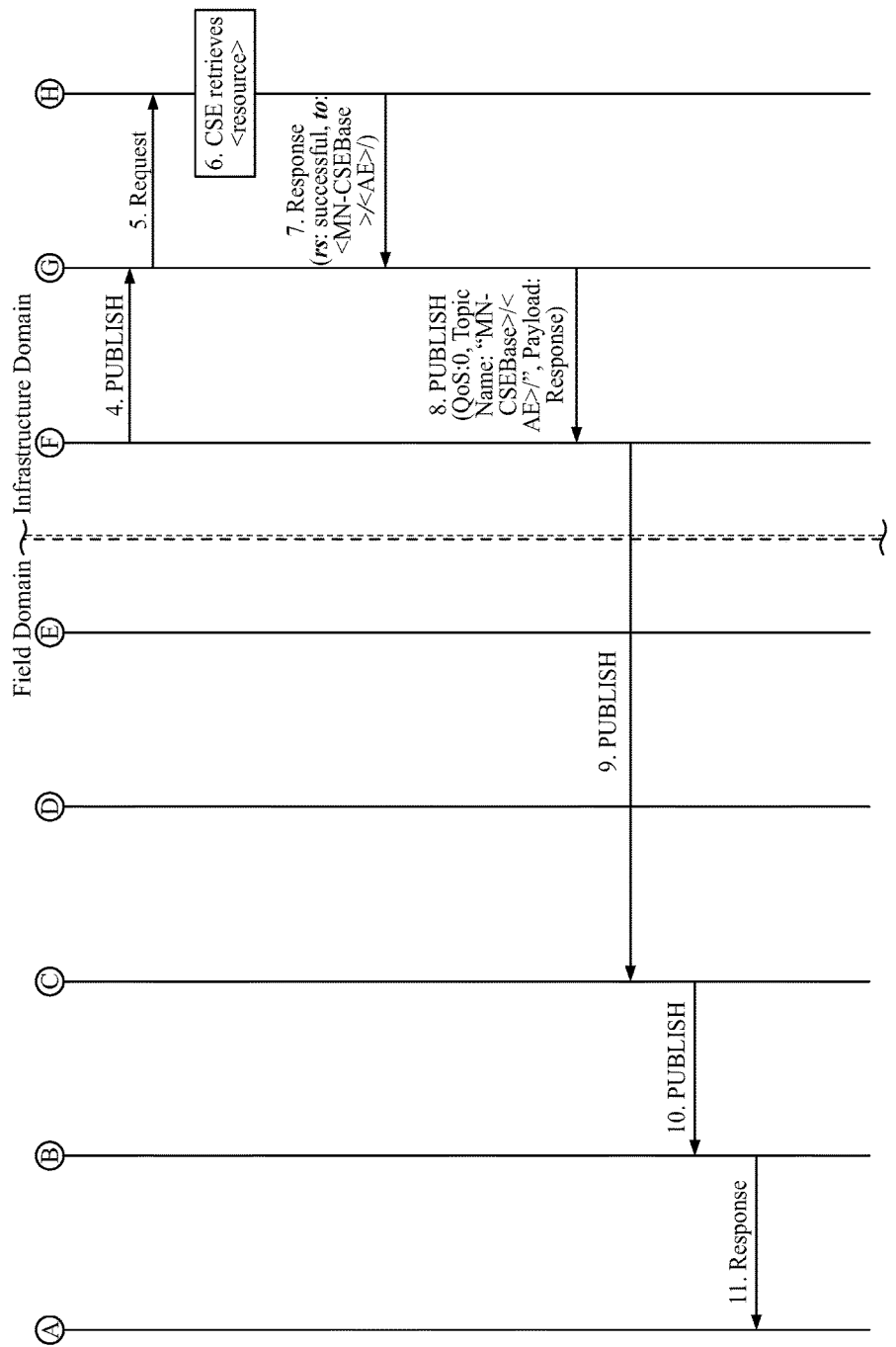

FIG. 19 is a flow diagram that illustrates an example of a retrieve service layer operation.

Pre-Condition Steps of FIG. 19.

These steps can be performed whenever network connections between nodes must be (re)established. The AE 1802 has already registered and been assigned an AE-ID.

In pre-condition step 1 of FIG. 19, the ADN-AE 1802 directs the ADN MQTT Client 1814 to issue a CONNECT message to the MQTT Server+ 1812 associated with its Registrar CSE 1804. The AE Identifier (AE-ID), or a locally unique relative version based on the <AE> resource name, is used as the ClientID parameter in the CONNECT message.

In pre-condition step 2 of FIG. 19, the MQTT Server+ 1812 responds with a CONNACK message indicating the connection was accepted.

In pre-condition step 3 of FIG. 19, the ADN-AE 1802 directs the ADN MQTT Client to issue a SUBSCRIBE message to the MQTT Server+ 1812 of the Registrar CSE 1804. The <AE> URI is used to form the Topic Filter parameter in the SUBSCRIBE message. Specifically, the MQTT special character "/" is appended to the <AE> URI to construct the Topic Filter string.

In pre-condition step 4 of FIG. 19, the MQTT Server+ 1812 responds with a SUBACK message indicating that the subscription request was received and processed.

In pre-condition step 5 of FIG. 19, the IN-CSE 1806 directs the IN MQTT Client 1820 to issue a CONNECT message to the MQTT Server+ 1822 associated with that IN 1824. The IN's CSE Identifier (IN-CSE-ID which is unique across the M2M Service Provider domain) is used as the ClientID parameter in the CONNECT message.

In pre-condition step 6 of FIG. 19, the MQTT Server+ 1812 responds with a CONNACK message indicating the connection was accepted.

In pre-condition step 7 of FIG. 19, the IN-CSE 1806 directs the IN MQTT Client 1820 to issue a SUBSCRIBE message to the IN MQTT Server+ 1822. The IN-CSE-ID is used to construct the Topic Filter parameter in the SUBSCRIBE message. Three separate Topic Filter strings are included in this parameter: '<IN-CSE-ID>', plus two additional strings formed by appending the MQTT single-level and multi-level wildcard characters to '<IN-CSE-ID>'.

In pre-condition step 8 of FIG. 19, the MQTT Server+ 1822 responds with a SUBACK message indicating each of the three subscription requests was received and processed.

In Steps 9-16 the MQTT Server+ 1822 acts as an MQTT Client when it issues CONNECT or SUBSCRIBE.

In pre-condition step 9 of FIG. 19, the MN-CSE 1804 directs the MN MQTT Server+ 1812 to issue a CONNECT message to the IN MQTT Server+ 1822 (the address of the IN MQTT Server+ 1822 is preconfigured). The MN-CSE-ID is used as the ClientID parameter.

In pre-condition step 10 of FIG. 19, the IN MQTT Server+ 1822 responds with a CONNACK message indicating the connection was accepted.

In pre-condition step 11 of FIG. 19, the MN-CSE 1804 directs the MN MQTT Server+ 1812 to issue a SUBSCRIBE message to the IN MQTT Server+ 1822. The <MN-CSE-ID> URI is used to form the Topic Filter parameter string in the SUBSCRIBE message. Specifically, the MQTT special characters "/#" are appended to the <MN-CSE-ID> URI to construct the Topic Filter string. This string instructs the IN MQTT Server+ 1822 to forward to the MN MQTT Server+ 1812 any received Topic Name at or below the first level of MN-CSEBase.

In pre-condition step 12 of FIG. 19, the IN MQTT Server+ 1822 responds with a SUBACK message indicating that the subscription request was received and processed.

In pre-condition step 13 of FIG. 19, the IN-CSE 1806 directs the IN MQTT Server+ 1822 to issue a CONNECT message to the MN MQTT Server+ 1822 (the address of the MN MQTT Server+ 1812 is preconfigured). The IN-CSE-ID is used as the ClientID parameter.

In pre-condition step 14 of FIG. 19, the MN MQTT Server+ 1812 responds with a CONNACK message indicating the connection was accepted.

In pre-condition step 15 of FIG. 19, the IN-CSE 1806 directs the IN MQTT Server+ 1822 to issue a SUBSCRIBE message to the MN MQTT Server+ 1822. The <IN-CSE-ID> URI is used to form the Topic Filter parameter string in the SUBSCRIBE message. Specifically, the MQTT special characters "/#" are appended to the <IN-CSE-ID> URI to construct the Topic Filter string. This string instructs the MN MQTT Server+ 1812 to forward to the IN MQTT Server+ 1822 any received Topic Name at or below the first level of IN-CSEBase.

In pre-condition step 16 of FIG. 19, the MN MQTT Server+ 1812 responds with a SUBACK message indicating that the subscription request was received and processed.

Operation Steps of FIG. 19.

The steps below presuppose that the above Pre-condition steps have occurred.

In operation step 1 of FIG. 19, the ADN-AE 1802 ("Originator AE") issues a Service Layer Retrieve Request primitive to the ADN MQTT Client 1814. The to parameter of the primitive is the URI for the resource located under <IN-CSEBase> (which is also used as the MQTT Topic Name string). The fr parameter is the <AE-ID> URI (this is used by the Target CSE to address the response).

In operation step 2 of FIG. 19, the ADN MQTT Client 1814 issues a PUBLISH message having the Request primitive as its Payload to the MN MQTT Server+ 1812 (with which it established a connection in Pre-condition Step [0147] of FIG. 19).

In operation step 3 of FIG. 19, the MN MQTT Server+ 1812 compares the received Topic Name (the resource URI under <IN-CSEBase>) to its subscription list and finds a match corresponding to the IN MQTT Server+ 1822 (see Pre-condition Step 14 of FIG. 19 above). The MN MQTT Server+ 1812 forwards the PUBLISH message to the IN MQTT Server+ 1822.

In operation step 4 of FIG. 19, the IN MQTT Server+ 1822 compares the received Topic Name (the resource URI under <IN-CSEBase>) to its subscription list and finds a match corresponding to the IN MQTT Client (see Pre-condition Step 6 of FIG. 19 above). The IN MQTT Server+ forwards the PUBLISH message to the IN MQTT Client 1820.

In operation step 5 of FIG. 19, the IN MQTT Client delivers the received payload (i.e., Retrieve Request primitive) to the IN-CSE 1806 (Target CSE).

In operation step 6 of FIG. 19, the specified resource content is retrieved (if the Originator AE 1802 has access rights).

In operation step 7 of FIG. 19, the IN-CSE 1806 issues a Retrieve Response primitive to the IN MQTT Client 1820. The to parameter of the outgoing primitive is set to the received fr parameter (the <AE> URI with "/" appended). The cn parameter is set to the appropriate content; in the success case (shown) it is set to the requested content of the retrieved resource.

In operation step 8 of FIG. 19, the IN MQTT Client 1820 issues a PUBLISH message having the Response Primitive as its payload to the IN MQTT Server+ 1822.

In operation step 9 of FIG. 19, the IN MQTT Server+ 1822 compares the received Topic Name (the URI of <AE>, which is under <MN-CSEBase>, with "/" appended) to its subscription list and finds a match corresponding to the MN MQTT Server+ 1812 (see Pre-condition Step [0161] 14 above). The IN MQTT Server+ 1822 forwards the PUBLISH message to the MN MQTT Server+ 1812.

In operation step 10 of FIG. 19, the MN MQTT Server+ 1812 compares the received Topic Name (the URI of <AE>, which is under <MN-CSEBase>, with "/" appended) and finds a match corresponding to the ADN-AE. The MN MQTT Server+ 1812 forwards the PUBLISH message to the ADN MQTT Client 1814. See also the Topic Name matching example in FIG. 16.

In operation step 11 of FIG. 19, the ADN MQTT Client 1814 delivers the Retrieve Response (i.e., the payload of the PUBLISH message) to the Originator AE 1802.

One embodiment is a method at an MQTT server+ 1812 at a middle node. A subscribe request is received from an application with at a topic filter indicating the middle node 1810 and the application 1816 as shown in precondition step 3 of FIG. 19. A subscribe request is sent to an MQTT server 1822 at an infrastructure node 1824 for a topic with a topic filter indicating the infrastructure node 1824 as shown in precondition step 11 of FIG. 19. A subscribe request is received from the MQTT server 1822 at an infrastructure node 1824 for a topic with a topic filter indicating the infrastructure node 1824 as shown in precondition step 15 of FIG. 19. Messages can be forwarded through the middle node between the application and the infrastructure node using topics created at the middle node and infrastructure nodes.

It is understood that the entities performing the steps illustrated in FIG. 19 are logical entities that may be implemented in the form of software (i.e., computer-executable instructions) stored in a memory of, and executing on a processor of, a network node or computer system such as those illustrated in FIG. 22C or FIG. 22D. That is, the method(s) illustrated in FIG. 19 may be implemented in the form of software (i.e., computer-executable instructions) stored in a memory of a network node, such as the node or computer system illustrated in FIG. 22C or FIG. 22D, which computer executable instructions, when executed by a processor of the node, perform the steps illustrated in FIG. 19. It is also understood that any transmitting and receiving steps illustrated in FIG. 19 may be performed by communication circuitry of the node under control of the processor of the node and the computer-executable instructions (e.g., software) that it executes.

Figure 20:
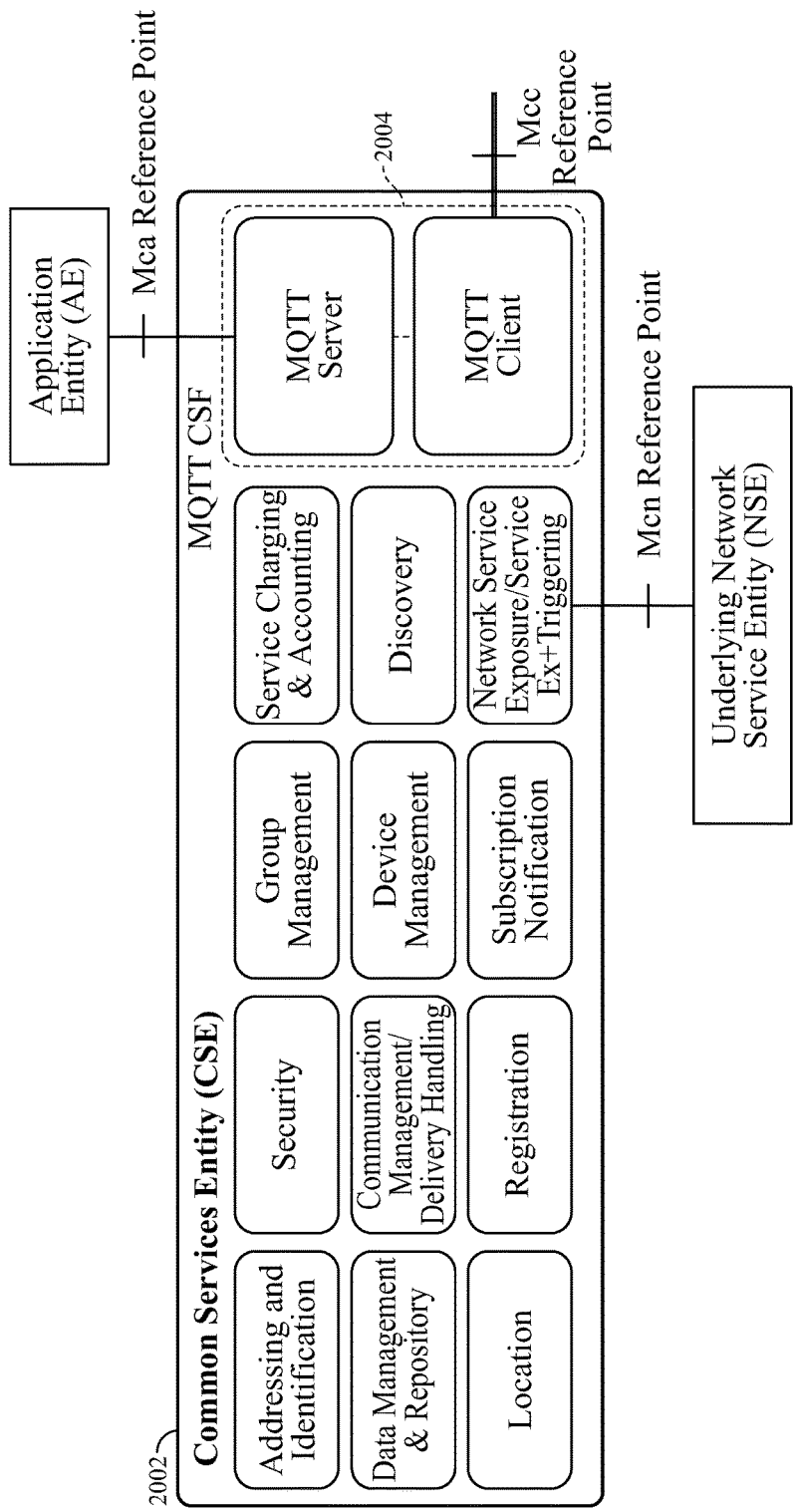
FIG. 20 is a diagram that illustrates a MQTT CSF in an Enhanced oneM2M ROA Embodiment.

FIG. 20 is a diagram that illustrates a MQTT CSF in an Enhanced oneM2M ROA Embodiment. The MQTT Server+ function described above can be implemented as an add-on software library—it does not need to be integrated into the CSE in order to function. However, additional optimizations are possible if the MQTT publication and delivery functionality is more tightly coupled with the other service functions as shown in FIG. 20.

For example, dynamic establishment and tear-down of connections is cumbersome if the MQTT Server+ 2004 and CSE 2002 are separate, because the CSE 2002 will need to know the connections maintained by the MQTT Server+ 2004 (presumably via an interrogation mechanism if they are distinct entities) at all times in order to manage them. Integration into the CSE 2002 mitigates this problem. Also, AE-ID pre-assignment will require much less protocol overhead because an integrated MQTT Server 2004 can pass the trigger string requesting AE-ID pre-assignment directly to the CSE 2002 for processing and return the result directly to the requesting AE.

It is understood that the functionality illustrated in FIG. 20 may be implemented in the form of software (i.e., computer-executable instructions) stored in a memory of, and executing on a processor of, a node of an M2M network (e.g., a server, gateway, device, or other computer system), such as one of those illustrated in FIG. 22C or 22D described below.

Figure 21:
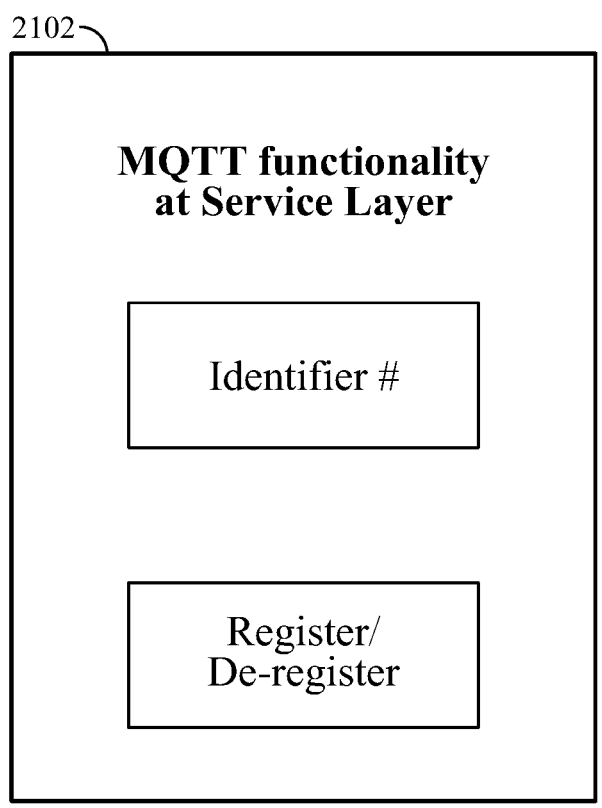
FIG. 21 is a diagram of a Graphical User Interface of one embodiment.

Interfaces, such as Graphical User Interfaces (GUIs), can be used to assist user to control and/or configure functionalities related to the service layer ROA internetworking using MQTT. FIG. 21 is a diagram that illustrates an interface 2102 that allows a user to determine identifier numbers and to register and deregister devices. It is to be understood that interface 2102 can be produced using displays such as those shown in FIGS. 22C-D described below.

Example M2M/IoT/WoT Communication System

FIG. 22A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as originator AE 1802, MQTT server+ 1812, 1822 and 2004 and CSE 1804, 1806 and 2002 and logical entities to create GUI 2102.

As shown in FIG. 22A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 22B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as originator AE 1802, MQTT server+ 1812, 1822 and 2004 and CSE 1804, 1806 and 2002. The M2M service layer 22 may be implemented by one or more servers, computers, devices, virtual machines (e.g. cloud/storage farms, etc.) or the like, including for example the devices illustrated in FIGS. 22C and 22D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 22B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as originator AE 1802, MQTT server+ 1812, 1822 and 2004 and CSE 1804, 1806 and 2002 and logical entities to create GUI 2102 may be hosted within a M2M service layer instance hosted by an M2M node, such as an M2M server, M2M gateway, or M2M device, as shown in FIG. 22B. For example, the logical entities such as originator AE 1802, MQTT server+ 1812, 1822 and 2004 and CSE 1804, 1806 and 2002 and logical entities to create GUI 2102 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs)

(i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 22C or FIG. 22D described below.

Further, logical entities of the present application such as originator AE 1802, MQTT server+ 1812, 1822 and 2004 and CSE 1804, 1806 and 2002 and logical entities to create GUI 2102 can implemented as part of an M2M network that uses a Service Oriented Architecture (SOA) and/or a Resource-Oriented Architecture (ROA) to access services of the present application.

FIG. 22C is a block diagram of an example hardware/software architecture of a M2M network node 30, such as an M2M device 18, an M2M gateway 14, an M2M server, or the like. The node 30 can execute or include logical entities such as originator AE 1802, MQTT server+ 1812, 1822 and 2004 and CSE 1804, 1806 and 2002 and logical entities to create GUI 2102. The device 30 can be part of an M2M network as shown in FIG. 22A-B or part of a non-M2M network. As shown in FIG. 22C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 22C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 22C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 22D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as originator AE 1802, MQTT server+ 1812, 1822 and 2004 and CSE 1804, 1806 and 2002 and logical entities to create GUI 2102. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 22A and FIG. 22B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as originator AE 1802, MQTT server+ 1812, 1822 and 2004 and CSE 1804, 1806 and 2002 and logical entities to create GUI 2102 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A node comprising a processor and a memory, the node further including computer-executable instructions stored in the memory of the node which, when executed by the processor of the node, cause the node to:
   receive a publish request from an application that uses a predetermined topic filter parameter related to a request for an application identifier;
   in response to the predetermined topic filter parameter, publish a message for a registrar that includes a temporary client identifier (ID);
   receive a message from the registrar that includes an assigned application name as payload;
   provide the assigned application name to the application; and
   receive a subscription request from the application including the assigned application name as part of a topic filter.

2. The node of claim 1 wherein the temporary client identifier is a null identifier.

3. The node of claim 1, wherein the node implements a Message Queuing Telemetry Transport (MQTT) server.

4. The node of claim 3, wherein the MQTT Server includes client functionality.

5. The node of claim 1, wherein the registrar is a registrar Common Services Entity (CSE).

6. A node comprising a processor and a memory, the node further including computer-executable instructions stored in the memory of the node which, when executed by the processor of the node, cause the node to:
   send a publish request to a server that uses a predetermined topic filter parameter related to a request for an application identifier;
   receive a message from the server that includes an assigned application name as payload; and
   send a subscription request to the server including the assigned application name as part of a topic filter.

7. The node of claim 6, wherein the server is a Message Queuing Telemetry Transport (MQTT) server.

8. A node comprising a processor and a memory, the node further including computer-executable instructions stored in the memory of the node which, when executed by the processor of the node, cause the node to:
   receive a subscribe request from an application with a topic filter indicating a first middle node and the application;
   send a subscribe request to a server at an infrastructure node for a topic with the topic filter indicating the infrastructure node; and
   receive a subscribe request from the server at the infrastructure node for the topic with the topic filter indicating the infrastructure node, wherein messages are forwarded through the first middle node between the application and the infrastructure node using the topic at the first middle node and the infrastructure node.

9. The node of claim 8 wherein the node is a second middle node.

10. The node of claim 8, wherein the node implements a Message Queuing Telemetry Transport (MQTT) server.

11. The node of claim 10, wherein the MQTT Server includes client functionality.

12. The node of claim 8, wherein the server at the infrastructure node is a Message Queuing Telemetry Transport (MQTT) server.

13. A method for use by a node, wherein the node comprises a processor and memory, and wherein the node further includes computer-executable instructions stored in the memory which, when executed by the processor, perform functions of a method comprising:
   receiving a publish request from an application that uses a predetermined topic filter parameter related to a request for an application identifier;
   in response to the predetermined topic filter parameter, publishing a message for a registrar that includes a temporary client identifier (ID);
   receiving a message from the registrar that includes an assigned application name as payload;
   providing the assigned application name to the application; and
   receiving a subscription request from the application including the assigned application name as part of a topic filter.

14. The method of claim 13 wherein the temporary client identifier is a null identifier.

15. The method of claim 13, wherein the node implements a Message Queuing Telemetry Transport (MQTT) server.

16. The method of claim 15, wherein the MQTT Server includes client functionality.

17. The method of claim 13, wherein the registrar is a registrar Common Services Entity (CSE).

18. A method for use by a node, wherein the node comprises a processor and memory, and wherein the node further includes computer-executable instructions stored in the memory which, when executed by the processor, perform functions of a method comprising:
   sending a publish request to a server that uses a predetermined topic filter parameter related to a request for an application identifier;
   receiving a message from the server that includes an assigned application name as payload; and
   sending a subscription request to the server including the assigned application name as part of a topic filter.

19. The method of claim 18, wherein the node implements an application.

20. The method of claim 18, wherein the Server is an Message Queuing Telemetry Transport (MQTT) server that includes client functionality.

21. A method for use by a node, wherein the node comprises a processor and memory, and wherein the node further includes computer-executable instructions stored in the memory which, when executed by the processor, perform functions of a method comprising:
   receiving a subscribe request from an application with a topic filter indicating a first middle node and the application;
   sending a subscribe request to a server at an infrastructure node for a topic with the topic filter indicating the infrastructure node; and
   receiving a subscribe request from the server at the infrastructure node for the topic with the topic filter indicating the infrastructure node, wherein messages are forwarded through the first middle node between the application and the infrastructure node using the topic at the first middle node and the infrastructure node.

22. The method of claim 21 wherein the node is a second middle node.

23. The method of claim 21, wherein the node implements a Message Queuing Telemetry Transport (MQTT) server.

24. The method of claim 23, wherein the MQTT Server includes client functionality.

25. The method of claim 21, wherein the server at the infrastructure node is a Message Queuing Telemetry Transport (MQTT) server.

* * * * *

UNITED STATES PATENT AND TRADEMARK OFFICE
CERTIFICATE OF CORRECTION

PATENT NO. : 10,313,858 B2
APPLICATION NO. : 15/327146
DATED : June 4, 2019
INVENTOR(S) : Brown et al.

Page 1 of 1

It is certified that error appears in the above-identified patent and that said Letters Patent is hereby corrected as shown below:

In the Specification

At Column 17, Line 15, delete "infrastructure node 1824" and substitute therefor -- middle node 1810 --

In the Claims

At Column 27, Line 12, Claim 21, delete "infrastructure" and substitute therefor -- middle --

Signed and Sealed this
Nineteenth Day of November, 2019

Andrei Iancu
*Director of the United States Patent and Trademark Office*